United States Patent
Noda

(10) Patent No.: US 7,962,781 B2
(45) Date of Patent: Jun. 14, 2011

(54) CONTROL METHOD FOR INFORMATION STORAGE APPARATUS, INFORMATION STORAGE APPARATUS AND COMPUTER READABLE INFORMATION RECORDING MEDIUM

(75) Inventor: Hiroshi Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 243 days.

(21) Appl. No.: 12/140,870

(22) Filed: Jun. 17, 2008

(65) Prior Publication Data

US 2009/0313509 A1    Dec. 17, 2009

(51) Int. Cl.
*G06F 11/00* (2006.01)
(52) U.S. Cl. .................................. 714/6.23; 714/47.1
(58) Field of Classification Search .............. 714/6, 7, 714/8, 42
See application file for complete search history.

(56) References Cited

U.S. PATENT DOCUMENTS

| | | | |
|---|---|---|---|
| 7,200,770 B2 * | 4/2007 | Hartwell et al. ................ 714/7 |
| 7,240,238 B2 | 7/2007 | Yanai et al. | |
| 7,330,325 B2 | 2/2008 | Vacar et al. | |
| 7,337,351 B2 * | 2/2008 | Zane et al. ..................... 714/6 |
| 7,392,425 B1 * | 6/2008 | Schoenthal et al. ............ 714/7 |
| 2002/0112198 A1 * | 8/2002 | Lim et al. ....................... 714/7 |
| 2003/0088805 A1 * | 5/2003 | Majni et al. .................... 714/6 |
| 2007/0050417 A1 * | 3/2007 | Hasegawa et al. ........ 707/200 |
| 2007/0220376 A1 * | 9/2007 | Furukawa .................... 714/57 |
| 2007/0250723 A1 * | 10/2007 | Shima et al. ............... 713/300 |

FOREIGN PATENT DOCUMENTS

| | | |
|---|---|---|
| JP | 2004-271983 | 9/2004 |
| JP | 2007-058484 | 3/2007 |
| JP | 2007-249441 | 9/2007 |
| JP | 2007-293448 | 11/2007 |

* cited by examiner

*Primary Examiner* — Marc Duncan
(74) *Attorney, Agent, or Firm* — Fujitsu Patent Center

(57) ABSTRACT

A control method for an information storage apparatus has the steps of: providing redundancy of information stored in the information storage apparatus; a redundancy failure recording part recording a record of a redundancy failure in a state recording part, when the failure has occurred in keeping of the redundant state of the information; a redundancy monitoring part reading the record of the redundancy failure from the state recording part the record; and a reporting part reporting the redundancy failure when the record of the redundancy failure is read by the redundancy monitoring part.

12 Claims, 17 Drawing Sheets

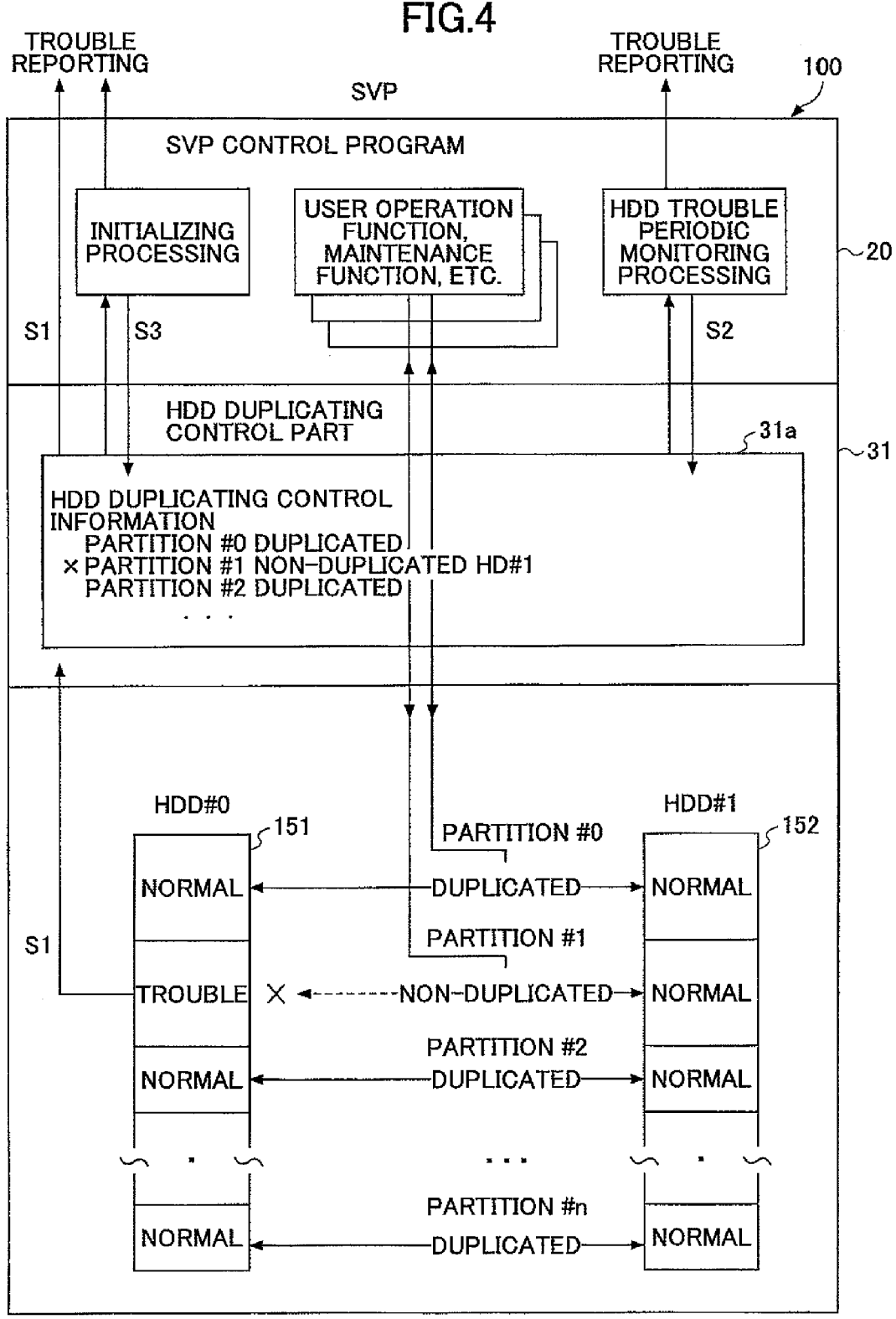

FIG.5

| DUPLICATION EFFECTIVE STATE |
| ON-RESTORATION INDICATING FLAG |
| NUMBER OF PARTITIONS |
| PARTITION #0 DUPLICATION STATE |
| PARTITION #1 DUPLICATION STATE |
| PARTITION #2 DUPLICATION STATE |
| ⋮ |
| PARTITION #n DUPLICATION STATE |

| PARTITION #0 MASTER HDD | PARTITION #0 PHYSICAL POSITION |
| PARTITION #1 MASTER HDD | PARTITION #1 PHYSICAL POSITION |
| PARTITION #2 MASTER HDD | PARTITION #2 PHYSICAL POSITION |
| ⋮ | ⋮ |
| PARTITION #n MASTER HDD | PARTITION #n PHYSICAL POSITION |

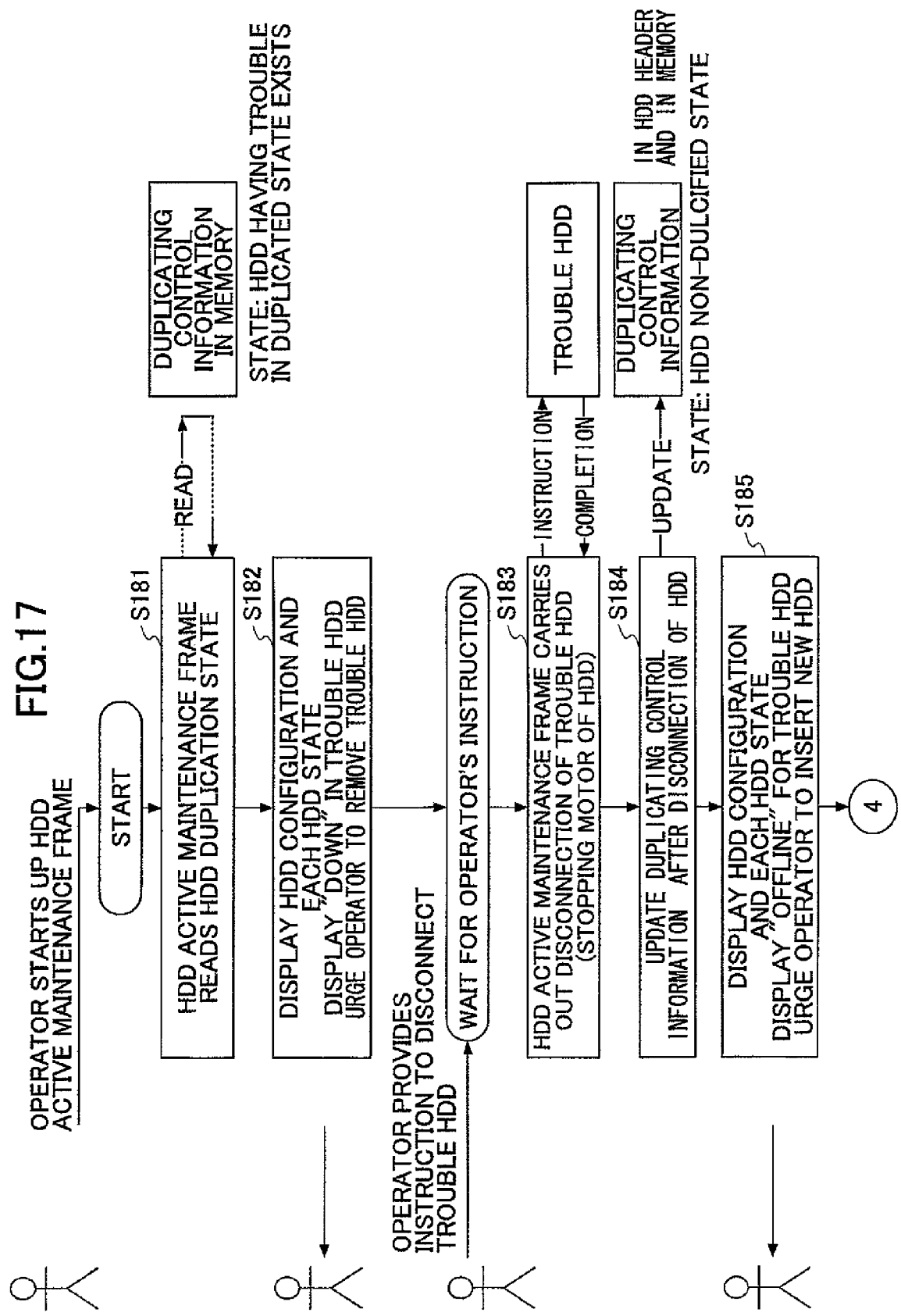

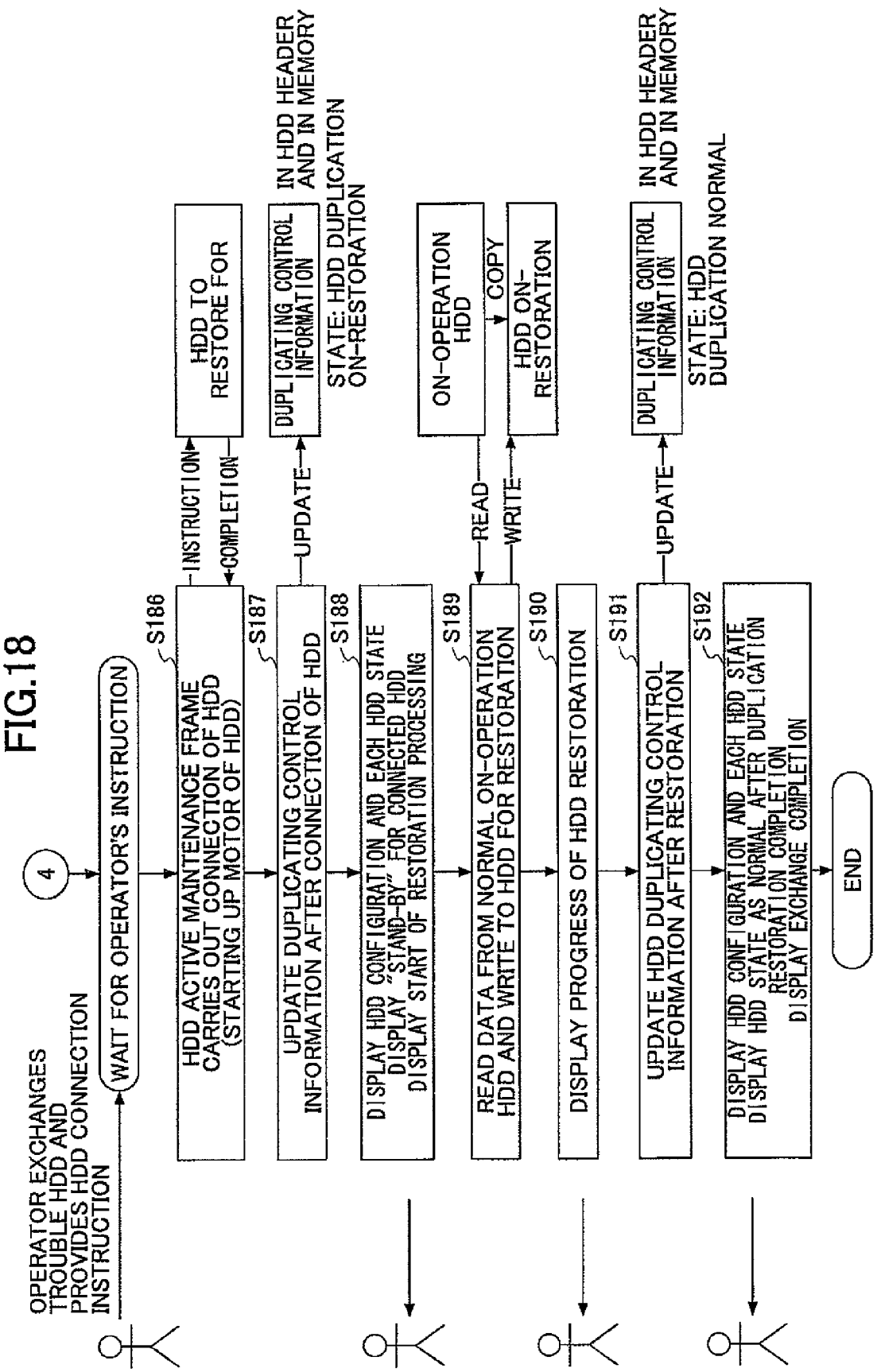

CONTROL METHOD FOR INFORMATION STORAGE APPARATUS, INFORMATION STORAGE APPARATUS AND COMPUTER READABLE INFORMATION RECORDING MEDIUM

BACKGROUND OF THE INVENTION

1. Field of the Invention

The present invention relates to a control method for an information storage apparatus, an information storage apparatus, a program and a computer readable information recording medium, and, in particular, to a control method for an information storage apparatus having a function of providing redundancy to information stored in the information storage apparatus, the information storage apparatus, a program for causing a computer to carry out the control method, and a computer readable information recording medium storing the program.

2. Description of the Related Art

In an information storage apparatus mounting hard disk drives in such a manner that redundant hard disk drives are provided for the purpose of improving reliability of information stored therein, a redundancy failure may occur in which a hard disk drive providing the redundancy has a light trouble.

For example, as shown in FIG. 1, an information storage apparatus as a computer, called an SVP (service processor) 100', for managing and controlling a large-scale computer, mounts two hard disk drives HDD#0, 151 and HDD#1, 152, storing an SVP control program 20' and control data required for achieving a user operation function, a maintenance function, a testing function, a communication function with an external monitoring apparatus and so forth.

The SVP is also provided with an HDD redundancy control part 31' for managing and controlling these two hard disk drives as resources having a redundant duplicated configuration.

The HDD redundancy control part partitions the two hard disk drives in the identical configurations, and carries out duplicating control in the thus-obtained partition units.

Further, when detecting an un-restorable trouble in one of these two hard disk drives (in the example of FIG. 1, the hard disk drive HDD#0), the HDD duplicating control part switches operation of the partition having the trouble (in the example of FIG. 1, a partition #1) into a non-duplicated control state of using only the normal one of the hard disk drives, and thus, operation of the SVP control program, as a host system, continues in the state.

In this case, the HDD duplicating control part reports the fact that the redundancy of the hard disk drives, i.e., the duplicated state thereof, has thus partially failed, to a maintenance staff.

It is noted that, in the specification and claims, 'redundancy fails' or 'redundancy failure' means, from a state where information is provided with redundancy, that is, the information is copied, thus a plurality of sets of information each having identical contents are created, and thus, the plurality of sets of information having the identical contents are duplicately stored in a plurality of recording media, respectively, i.e., a redundant state, not all but one of the above-mentioned plurality of sets of information having the identical contents has a trouble so that the redundancy fails.

It is noted that, in such a 'redundancy failure', the remaining ones of the plurality of sets of information having the identical contents have no trouble, thus no actual loss in the information has occurred, and thus, merely an expected advantage for security of the information from the redundancy, thus lowers to a corresponding degree.

That is, in the example of FIG. 1, a frequency of occurrences of a situation that such an-restorable trouble also occurs on the hard disk drive on the normal side for the partition, for which partition the duplicated state has thus already failed in the preceding redundancy failure, is low. Accordingly, it may be said that urgency for an actual exchange work of the trouble hard disk drive which is a cause of the above-mentioned redundancy failure, is not so high.

However, it is not preferable that such a state that the redundancy failure is left un-solved for a long period. The possibility that the corresponding partition may have a trouble also in the hard disk drive on the normal side is small, but is not zero. When such a situation that the hard disk drive on the normal side also has a trouble, occurs, the corresponding information may be actually lost, and thus, operation of the SVP may have to be interrupted. Therefore, it is preferable that a maintenance staff rapidly prepares a new hard disk drive and exchange the trouble hard disk drive therefor for a restoration from the redundancy failure, to positively avoid such a serious situation.

On one hand, the large-scale computer, which the SVP monitors and controls, has numerous devices, parts and components, as well as many items to be reported for maintenance, other than the above-mentioned trouble of the hard disk drive of the SVP, and occurrence frequencies of these items to be reported are high.

When a light trouble causing a redundancy failure for a partition is detected in the hard disk drive, this matter is reported to a maintenance staff from the SVP. However, assuming that many other items to be reported having higher priority occur by accident simultaneously, these items are simultaneously reported to the maintenance staff, and thus, the reporting of the above-mentioned light trouble in the hard disk drive may be overlooked.

Japanese Laid-Open Patent Application 2004-271983 discloses a related art.

SUMMARY OF THE INVENTION

The present invention has been devised in consideration of such a situation, and an object of the present invention is to provide a configuration such that, when a trouble occurs in keeping redundancy of information stored in an information storage apparatus, a measure to solve the trouble can be positively carried out.

According to the present invention, a redundancy state of information stored in the information storage apparatus is provided, a redundancy failure is recorded by a redundancy failure recording part when the redundancy failure has occurred in keeping the redundant state of the information, the record of the redundancy failure is read by a redundancy monitoring part, and the redundancy failure is reported by a reporting part when the record of the redundancy failure is read by the redundancy monitoring part.

In the present invention, since the record of the redundancy failure is thus read by the redundancy monitoring part, and then, the record is reported by the reporting part.

Therefore, even if a maintenance staff misses immediate handling an initial report made when the redundancy failure has occurred, and leaves it un-solved, the record of the redundancy failure is read by the redundancy monitoring part, and, the record is reported again by the reporting part when the record is thus read by the redundancy monitoring part.

Thus, it is possible to positively avoid such a situation that the redundancy failure is left un-solved for a long period.

Thus, by the present invention, when a trouble occurs in keeping redundancy in an information storage apparatus having a function of providing redundancy to information stored in the information storage apparatus, it is possible to prevent a redundancy failure state, if any, from being left un-solved for a long period. As a result, redundancy of the information stored in the information storage apparatus can be positively maintained, and thus, it is possible to effectively ensure security of the information stored in the information storage apparatus.

BRIEF DESCRIPTION OF THE DRAWINGS

Other objects and further features of the present invention will become more apparent from the following detailed description when read in conjunction with the accompanying drawings:

FIG. 4 is a block diagram illustrating the control method for the information storage apparatus in the embodiment of the present invention;

FIG. 5 illustrates one example of HDD duplicating control information shown in FIG. 4;

FIGS. 17-18 show a flow chart illustrating a flow of hard disk drive duplication restoration processing in the control method for the information storage apparatus in the embodiment of the present invention.

DETAILED DESCRIPTION OF THE PREFERRED EMBODIMENTS

Below, embodiments of the present invention will be described in detail with reference to figures.

First, an embodiment 1 of the present invention will be described.

According to the embodiment 1 of the present invention, in an apparatus in which hard disk drives having a redundant duplicated configuration are managed and controlled, and, operation can be continued with a non-redundant configuration even when a trouble has occurred in one hard disk drive, if the trouble is left unsolved, the trouble is detected and reported, automatically the unsolved state is detected again, and is reported repetitiously, periodically and each time power supply to the apparatus is started up.

Figure 1:
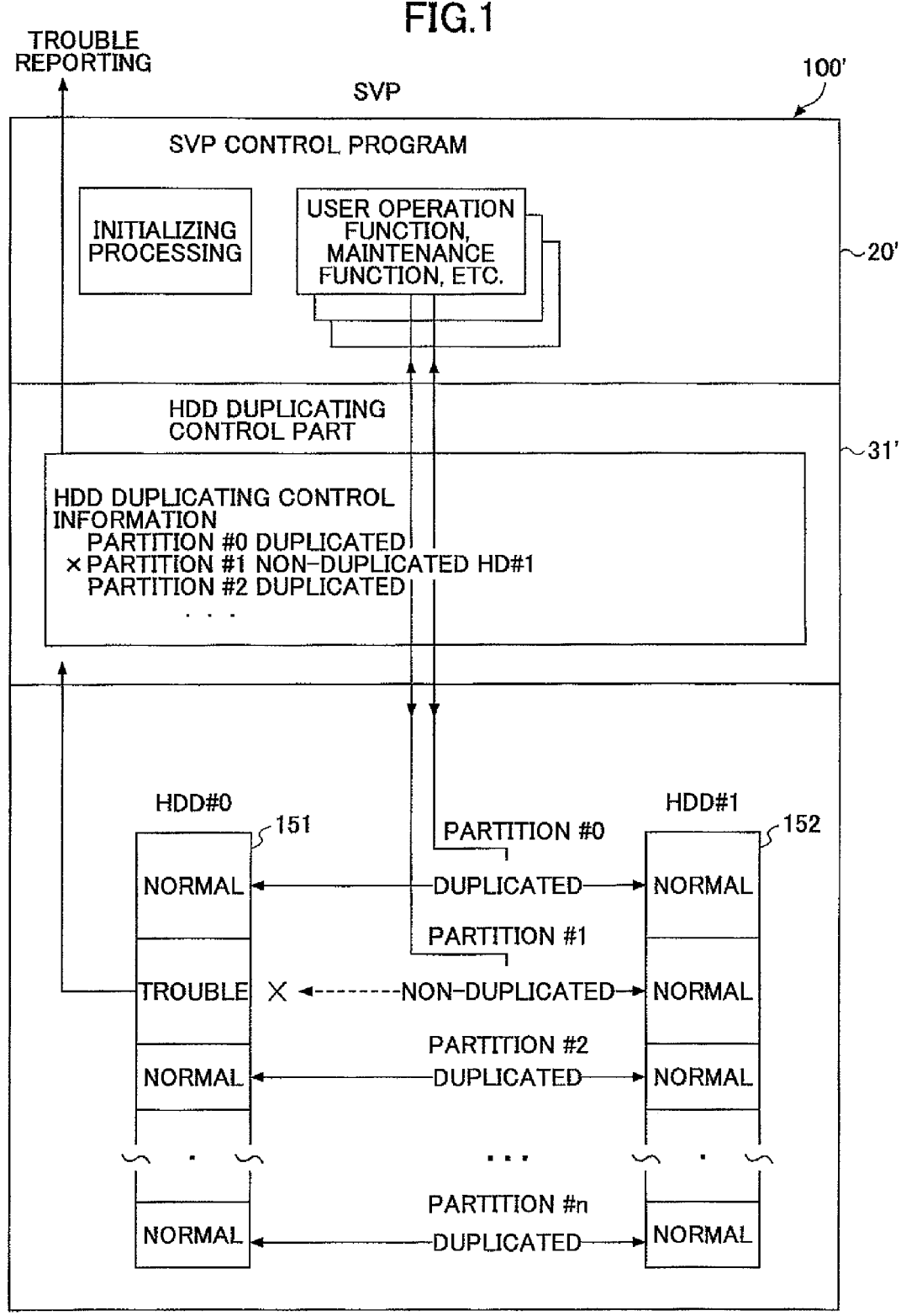
FIG. 1 is a block diagram illustrating a control method for an information storage apparatus in one example of the prior art.
Figure 2:
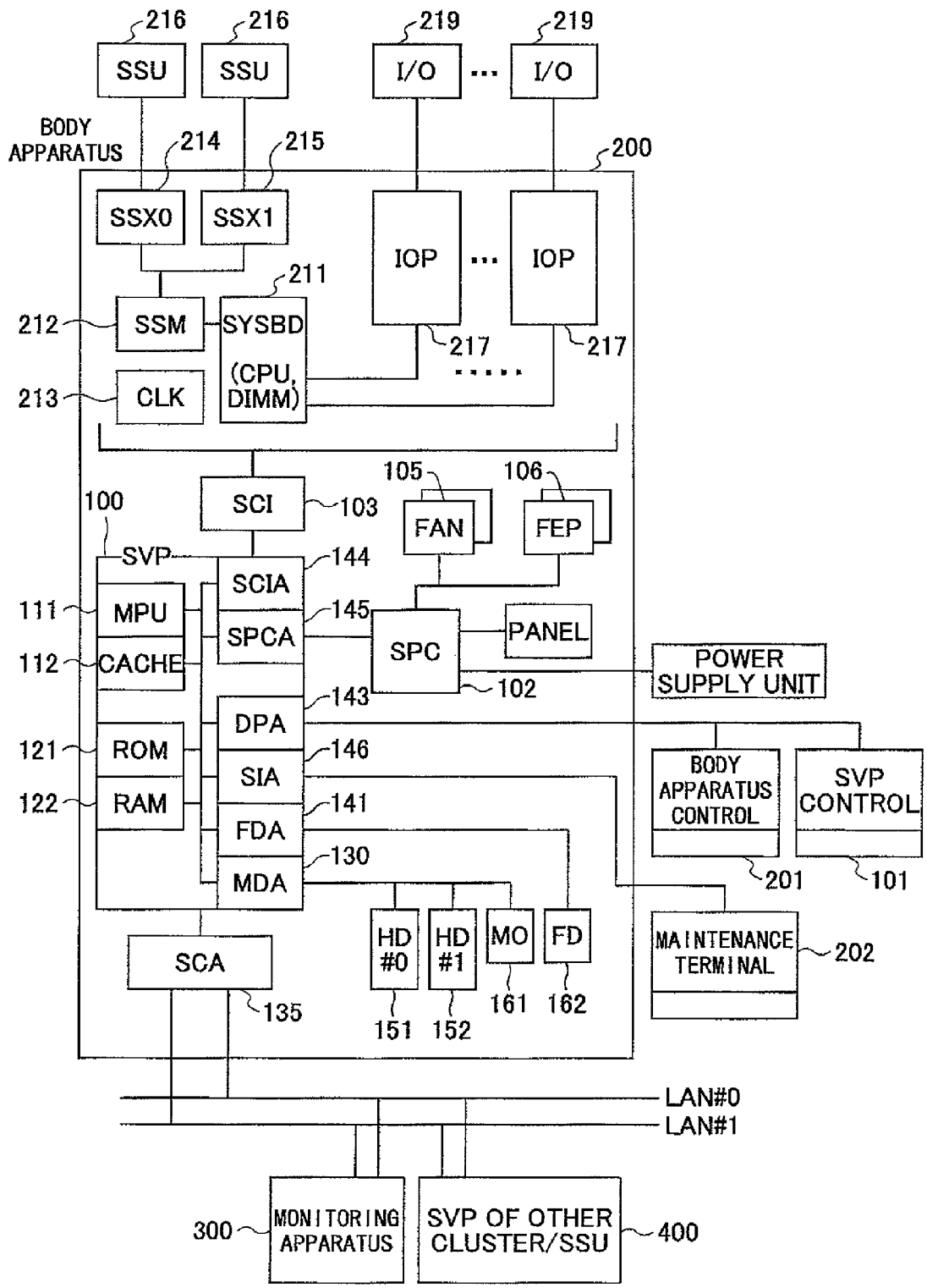
FIG. 2 is a block diagram illustrating a hardware configuration of a computer having a function of carrying out a control method for an information storage apparatus in an embodiment of the present invention.

FIG. 2 shows a block diagram illustrating general features of a computer system including an SVP (service processor) as another computer which carries out the control method for the information storage apparatus in the embodiment 1 of the present invention.

In FIG. 2, the computer system includes a body apparatus 200 which has a system board 211, and, around it, various sorts of functional units SSM 212, SSX0 214, SSX1 215, SSU 216, IOP 217, I/O 219 and CLK 213.

A body apparatus consol 201 is a consol for a user to operate various functions which the computer system provides (i.e., functions provided by an OS which operates in the system board 211).

An SVP consol 101 is a consol for operating for a user operation function, a maintenance function or a testing function. In a user mode, only the user operation function can be operated. In a maintenance mode, operation required for maintenance can be made. The maintenance mode is used when user operation is interrupted and maintenance is carried out.

A maintenance terminal 202 is a consol used for a user to operate for functions required for maintenance when maintenance is carried out without interruption of user operation (i.e., active maintenance). This consol is connected only when active maintenance is carried out.

An SVP 100 has an MPU (microprocessor unit) 111, a cache 112, a ROM 121, a RAM 122, hard disk drives 151, 152 which have the above-mentioned duplicated configuration, an MO drive 161, a flexible disk drive 162 and so forth.

The above-mentioned SSU 216 and I/O 219 are connected externally to the body apparatus 200. The SSU 216 is a system storage unit, and the I/O 219 is an input/output unit such as a DASD.

Further, the following parts are connected inside of the body apparatus 200, and are controlled or maintained by the SVP 100:

A system board 211: A plurality of CPUs and memories are mounted.

A CLK (clock board) 213: It provides a clock signal to the system board 211.

A SSM (SS Mover) 212: It is connected to the SSU 216, and carries out data transfer between a main memory and a system memory.

An IOP (input/output processor) 217: It carries out data transfer with the input/output unit.

A SCI (system consol interface) 103: It provides an interface for control and communication made by the SVP 100 for the respective parts in the body apparatus 200.

A SPC (system power controller) 102: It controls power supply for the entirety of the body apparatus 200.

A FAN 105: It is a fan for cooling.

A FEP (front end power supply) 106: It supplies power to each part of the body apparatus 200.

The following parts are the SVP itself and adapters in the SVP:

The SVP (service processor) 100: It provides the user operation function, the maintenance function, the testing function and a communication function for an external monitoring apparatus 300.

A SCIA (SCI adapter) 144: It is an adapter which carries out communication and control of the body apparatus 200 via the SCI 103.

A SPCA (system power controller adapter) 145: It carries out control of an interface with the SPC 103.

A DPA (display adapter) 143: It connects to a display device.

A SIA (serial interface adapter) 146: It connects to a communication line.

A FDA (flexible disk adapter) 141: It controls a flexible disk.

A MDA (micro disk adapter) 130: It controls the hard disk drives and an MO drive.

A SCA (SVP communication adapter) 135: It connects to a LAN, for carrying out communication with the external monitoring apparatus 300 or with another SVP 400.

Figure 3:
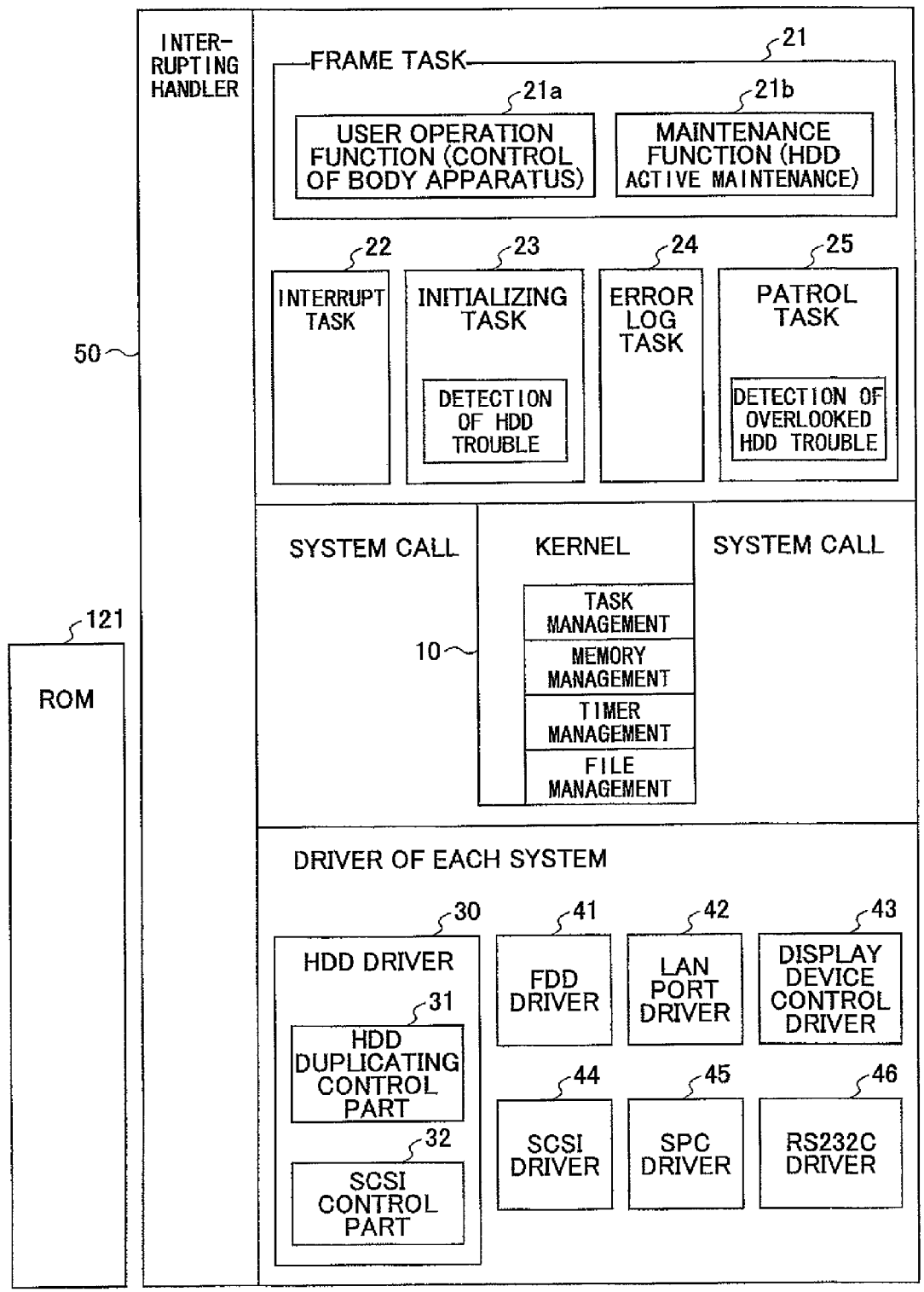
FIG. 3 is a block diagram illustrating a program configuration for causing a computer to execute the control method for the information storage apparatus in the embodiment of the present invention.

FIG. 3 is a block diagram illustrating a software configuration of the SVP 100.

Software of the SVP 100 has a program providing an SVP internal diagnosis function provided in the ROM 121, and an SVP control program 20 stored in the hard disk drives 151, 152. The SVP control program 20 has a kernel 10, a frame task 21, an interrupt task 22, an initializing task 23, an error log task 24 and a patrol task 25.

The initializing task 23 provides a function to detect a trouble of the hard disk drives 151, 152, and the patrol task 25 provides a function to detect an overlooked trouble of the hard disk drives 151, 152.

The SVP control program 20 further has a hard disk driver 30, a flexible disk driver 41, a LAN port driver 42, a display device control driver 43, a SCI driver 44 and a RS232C part driver 46.

The hard disk driver 30 has a HDD duplicating control part 31 and a SCSI control part 32.

The above-mentioned program provided in the ROM 121 carries out diagnosis of the inside of the SVP 100. That is, the program reads HDD duplicating control information written in header parts (partitions #0) of the hard disk drives 151, 152, and develops the contents thereof (i.e., HDD duplicating control information 31a) in a memory (i.e., a RAM 122). Further, this program loads the SVP control program 20 from the hard disk drives 151, 152.

The kernel 10 carries out state control of the respective tasks which the SVP control program 20 has, exclusive control and communication control between the tasks. Further, the kernel 10 carries out management and control of memory resources, timer resources, and files.

The HDD duplicating control part 31 of the hard disk driver 30 carries out control of duplicating, i.e., providing redundancy with the hard disk drives 151, 152, with the use of the above-mentioned duplicating control information 31a.

Further, the HDD duplicating control part 31 calls the SCSI control part 32 which then carries out starting up of the hard disk drives 151, 152, stopping the same, reading information therefrom, writing information thereto, or such.

Further, the HDD duplicating control part 31 starts up the error log task 24 through a system call when the hard disk drives 151, 152 have a trouble, and the error log task 24 carries out reporting of the trouble.

The SCSI control part 32 carries out starting up of the hard disk drives 151, 152, stopping the same, setting an operation mode thereof, writing information to the hard disk drives 151, 152, reading information therefrom, obtaining trouble information therefrom, and so forth.

It is noted that the SCSI control part 32 controls the two hard disk drives 151 and 152, as well as the MO drive 161.

The flexible disk driver 41 controls the flexible disk drive 162.

The LAN part driver 42 carries out communication control with the monitoring apparatus 300.

The display device control driver 43 carries out communication control with the consol 201 of the body apparatus 100 and the consol 101 of the SVP 100.

The RS232C part driver 46 carries out communication control with the maintenance terminal 202 according to RS232C.

The SPC driver 45 carries out communication control with the SPC 102. By means of the communication with the SPC 102, control for starting of power supply to the computer system, and disconnecting the same, is carried out.

The SCI driver 44 controls the body apparatus 200 through the SCI 103.

The initializing task 23 carries out initialization and starting up of each task which the SVP control program 20 has, when the SVP 100 is started up, and also, it carries out check for an overlooked trouble of the hard disk drives 151, 152. When an overlooked trouble of the hard disk drives 151, 152 is detected by the initializing task 23, the initializing task 23 starts up the error log task 24 which then carries out reporting the trouble.

Further, the patrol task 25 is periodically started up, and carries out monitoring of a state of the body apparatus 200 and also, carries out monitoring an overlooked trouble of the hard disk drives 151, 152. The patrol task 25 is started up every 500 ms, every 60 minutes, every day or every week, depending on what is monitored.

Monitoring of an overlooked trouble of the hard disk drives 151, 152 by the patrol task 25 is carried out every week. Then, when an overlooked trouble of the hard disk drives 151, 152 is detected by the patrol task 25, the patrol task 25 starts up the error log task 24 which then carries out reporting the trouble.

The error log task 24 is started up through a system call by the task which has detected the trouble when the trouble of the body apparatus 200, the trouble of the inside of the SVP 100 or the trouble of the hard disk drives 151, 152, has occurred, and then, stores an error log, displays on a consol or a panel, and reports to the monitoring apparatus 300.

The frame task 21 provides the user operation function 21a and the maintenance function 21b through the SVP consol 101 or the maintenance terminal 202.

The user operation function 21a corresponds to control functions provided by the body apparatus 200, and corresponds to various functions (for example, a communication control function for a large-scale communication network, or such) which the computer system should provide to the user as a basic role thereof.

The maintenance function 21b corresponds to a maintenance exchange function for exchanging parts/components of the body apparatus 200 and the SVP 100 themselves.

The interrupt task 50 carries out processing for interrupt made from the body apparatus 200 notified of through the SCI 103.

FIG. 4 shows a block diagram of what corresponds to functional parts concerning the present invention extracted from the functions of the SVP 100.

That is, according to the embodiment 1 of the present invention, the HDD duplicating control part 31 reads information from the hard disk drives 151, 152, detects a trouble, if any, of the hard disk drives 151, 152, upon writing information thereto, and reports the trouble (Step S1).

That is, when a light trouble of the hard disk drives 151, 152, i.e., a duplication failure (i.e., a redundancy failure) of a specific partition (in the example of FIG. 4, a partition #1), is detected, the monitoring apparatus 300 or the SVP consol 101 reports this matter to a maintenance staff, through a communication, LAN#0, LAN#2.

Further, through the function of the patrol task 25, periodic monitoring is carried out, and thereby an overlooked trouble of the hard disk drives 151, 152 is detected and reported (Step S2).

That is, when a trouble is left unsolved even after a predetermined period has elapsed since the light trouble of the hard disk drives 151, 152, i.e., the duplication failure of the partition (partition #1) occurred, the light trouble is thus detected, and, is again reported to the maintenance staff by means of the monitoring apparatus 300 or the SVP consol 101 through the communication network, LAN#0, LAN#1. In the same manner, the state is monitored every predetermined time interval, and the light trouble is thus detected and is reported to the maintenance staff rapaciously, until the duplicated state is restored (i.e., the light trouble is solved).

Further, by the function of the initializing task 23, the unsolved trouble of the hard disk drives 151, 152 is detected and reported when the computer system is started up (Step S3).

That is, when a trouble of the hard disk drives 151, 152, i.e., a duplication failure in a partition #1 is left unsolved and is detected even after operation of the system is stopped by the maintenance staff after the duplication failure of the partition #1 is detected, and then, operation of the system is again started, since the light trouble of the hard disk drives 151, 152, i.e., the duplication failure in the partition (partition #1) occurred, the light trouble is again reported to the maintenance staff by means of the monitoring apparatus 300 or the SVP consol 101 through the communication network, LAN#0, LAN#1.

As a result, it is possible to effectively avoid a problematic situation that a light trouble of the hard disk drives 151, 152 is left unsolved for a long period. Thus, it is possible to avoid a further problematic situation that operation of the SVP should be interrupted due to multiple troubles in the hard disk drives 151, 152, which may otherwise occur due to the light trouble being left unsolved for a long period. Thus, it is possible to provide a high reliable information storage function.

Below, a configuration of the SVP 100 concerning the function of providing redundancy to information will be described in further detail.

(1) Configuration of Duplicated Hard Disk Drives 151, 152:

The two hard disk drives 151 and 152 are partitioned in the same configuration, and the identical data is stored in the same position of the respective hard disk drives 151 and 152.

An area allocated to the same position in each of the two hard disk drives 151, 152 is called a partition, and is handled as a unit in the duplicating control.

For each partition, identical information is possessed by both a first one, i.e., a master one of the two hard disk drives 151, 152, and a second one, i.e., a slave one thereof, duplicately. That is, information of each partition is possessed in a duplicated or a redundant state.

(2) HDD Duplicating Control Information 31a:

To the two hard disk drives 151, 152, identification numbers are given in an order corresponding to positions at which the hard disk drives 151, 152 are mounted in the body apparatus 200 of the computer system, started from #0. Below, the hard disk drives 151, 152 may be referred to as hard disk drives HDD#0, HDD#1, respectively, for the sake of convenience of explanation, hereinafter.

Further, the plurality of partitions are given identification numbers, started from #0, in an order corresponding to addresses in the hard disk drives 151, 152.

The HDD duplicating control information 31a is configured by data tables corresponding to the identification numbers of the partitions.

Further, for each table, not only the number of a master hard disk drive which has the corresponding partition, but also, the number of a trouble hard disk drive, if any, which also has the corresponding partition duplicately, may be written.

The HDD duplicating control information 31a is stored in the partitions #0 (corresponding to header parts of storage areas of the respective hard disk drives 151, 152).

The HDD duplicating control information 31a is read from the hard disk drives 151, 152, when power supply to the computer system is started, is then developed in the memory 122, and thus, a duplicated configuration of the hard disk drives 151, 152 in previous operation is kept.

Further, when a state in the hard disk drives 151, 152 changes during operation of the computer system, the information developed in the memory 122 is updated accordingly, and simultaneously, the HDD duplicating control information written in the partitions #0 is updated.

Further, in the HDD duplicating control information 31a, a duplication effective state is recorded, which is read when a trouble occurs in the hard disk drive 151 or 152 and thus the trouble hard disk drive should be exchanged with a new one, where the trouble hard disk drive should be disconnected for the exchange purpose. The duplication effective state is information which indicates whether or not the hard disk drives 151, 152 are in a duplicated state or in a non-duplicated state.

The HDD duplicating control information will be described in detail with reference to FIG. 5 later.

(3) HDD duplicating control part 31:

When information is written in the hard disk drives 151, 152, the HDD duplicating control part 31 writes the identical information to corresponding areas of the two hard disk drives 151, 152 which duplicately have the corresponding partitions, as mentioned above.

Further, when information is read from the hard disk drives 151, 152, the information is read from the area of the master hard disk drive thereof.

When an error has occurred upon the above-mentioned writing operation, the master hard disk drive or the slave hard disk drive of the hard disk drives 151, 152 allocated for the partition, at which the error has occurred, is recognized as having a trouble.

When the master hard disk drive allocated for a partition at which information is written or read has a trouble, the hard disk drive on the side on which the trouble had not occurred, i.e., the slave hard disk drive, is then recognized as a new master hard disk drive for the partition.

(4) Reporting of a Trouble of the Hard Disk Drives 151, 152 by the HDD Duplicating Control Part 31 (i.e., Step S4 in FIGS. 6-9):

When a trouble has occurred in the master hard disk or the slave hard disk allocated for a partition, the HDD duplicating control part 31 recognizes that a light trouble has occurred in the hard disk drives 151, 152, i.e., a duplication failure has occurred in the partition.

When thus detecting the light trouble of the hard disk drives 151, 152, i.e., the duplication failure of the partition, the HDD duplicating control part 31 reports it to a maintenance staff by means of the monitoring apparatus 300 or the SVP consol 10s1, as mentioned above.

(5) Periodic Monitoring for the Hard Disk Drives 151, 152 (i.e., Step S5 in FIGS. 6-9):

The patrol task 25 of the SVP control program 20 carries out periodic monitoring for a trouble which may occur in the hard disk drives 151, 152. The patrol task 25 is started up at intervals of every week, and monitors whether or not a light trouble of the hard disk drives 151, 152, i.e., a duplication failure in a partition, exists.

When it is detected that such a light trouble exists, the light trouble is reported to a maintenance staff by means of the monitoring apparatus 300 or the SVP consol 101.

Further, the patrol task 25 monitors as to whether or not a light trouble exists in the hard disk drives 151, 152 every week as mentioned above, and, thus, repetitiously reports to a maintenance staff the light trouble until the light trouble is solved, i.e., the duplicated state (i.e., redundant state) of the hard disk drives 151, 152 is restored.

(6) Trouble Detecting for the Hard Disk Drives 151, 152 Upon Initializing Processing (Step S6 in FIGS. 6-9):

When operation of stopping the computer system is made by a maintenance staff and after that, operation of the system is started again, the initializing task 23 of the SVP consol program 20 determines whether or not the hard disk drives 151, 152 has a light trouble, i.e., whether or not a duplication failure in a partition has occurred.

When detecting such a light trouble in the hard disk drives 151, 152, the initializing task 23 reports to a maintenance staff by means of the monitoring apparatus 300 or the SVP consol 101.

FIG. 5 shows an example the HDD duplicating control information 31a.

In FIG. 5, the above-mentioned 'duplication effective state' indicates the above-mentioned duplicated state or non-duplicated state of the hard disk drives 151, 152, as below:
  0: duplicated state with both HDD#0, HDD#1;
  1: non-duplicated operation state with only HDD#0;
  2: non-duplicated operation state with only HDD#1

When a trouble hard disk drive is disconnected for the purpose that the trouble hard disk drive is exchanged in an active exchange manner, a 'non-duplicated operation state with only HDD#0' or 'non-duplicated operation state with only HDD#1' occurs. That is, a state in which any one of the hard disk drive operates solely, occurs. As a result, the duplicated (redundant) state of the stored information breaks, and thus, the non-duplicated state occurs.

That is, when any one of the hard disk drives 151, 152 has a trouble, operation is carried out only with the normal one. This state of operation is called 'non-duplicated operation'. In such a case, the hard disk drive having the trouble is disconnected, and, then, is replaced with a newly prepared hard disk drive in an active state.

'ON-RESTORATION INDICATING FLAG' in FIG. 5 indicates that the hard disk drives 151, 152 are in duplication restoration work, as below:
  0: copy for restoration has not been carried out;
  1: on copying from HDD#0 to HDD#1;
  2: on copying from HDD#1 to HDD#0

That is, when the duplication state breaks, i.e., any one of the hard disk drives 151, 152 has a trouble, and thus, operation is carried out only with the normal one. Then, when the depiction state is to be restored, information is copied from the normal one to another which is newly prepared, replaced with, and thus is newly mounted.

In FIG. 5, 'NUMBER OF PARTITIONS' indicates the number of partitions, which the hard disk drives 151, 152 have.

'PARTITION #n DUPLICATION STATE' (n: 0, 1, 2, ...) indicates whether or not the partition has a duplicated state, as below:
  0: the partition has a properly duplicated state;
  1: HDD#0 for the partition has a trouble;
  2: HDD#1 for the partition has a trouble;

In FIG. 5, "PARTITION #n MASTER HDD" (n: 0, 1, 2, ...) indicates a master hard disk drive and a slave hard disk drive, 151, 152, for a partition, as follows:
  0: HDD#0 acts as a master.

That is, when the partition has a duplicated state (i.e., in the above-mentioned "PARTITION #n DUPLICATION STATE") which indicates "HDD#1 for the partition has a trouble", or such, HDD#0 corresponds to an operation hard disk drive, and thus, acts as a master.
  1: HDD#1 acts as a master.

As mentioned above, when the partition has a duplicated state indicates "HDD#0 for the partition has a trouble", or such, HDD#1 corresponds to an operation hard disk drive, and thus, acts as a master.

In FIG. 5, "PARTITION #n PHYSICAL POSITION" (n: 0, 1, 2, ...) indicates a start position (address) of the partition.

FIGS. 6-9 show a flow chart illustrating an operation flow of the SVP control program 20 of the SVP 100.

Here, a flow starting from an occurrence of a trouble in the hard disk drives 151, 152, through actual exchange of the trouble hard disk drive, will be described.

Figure 6:
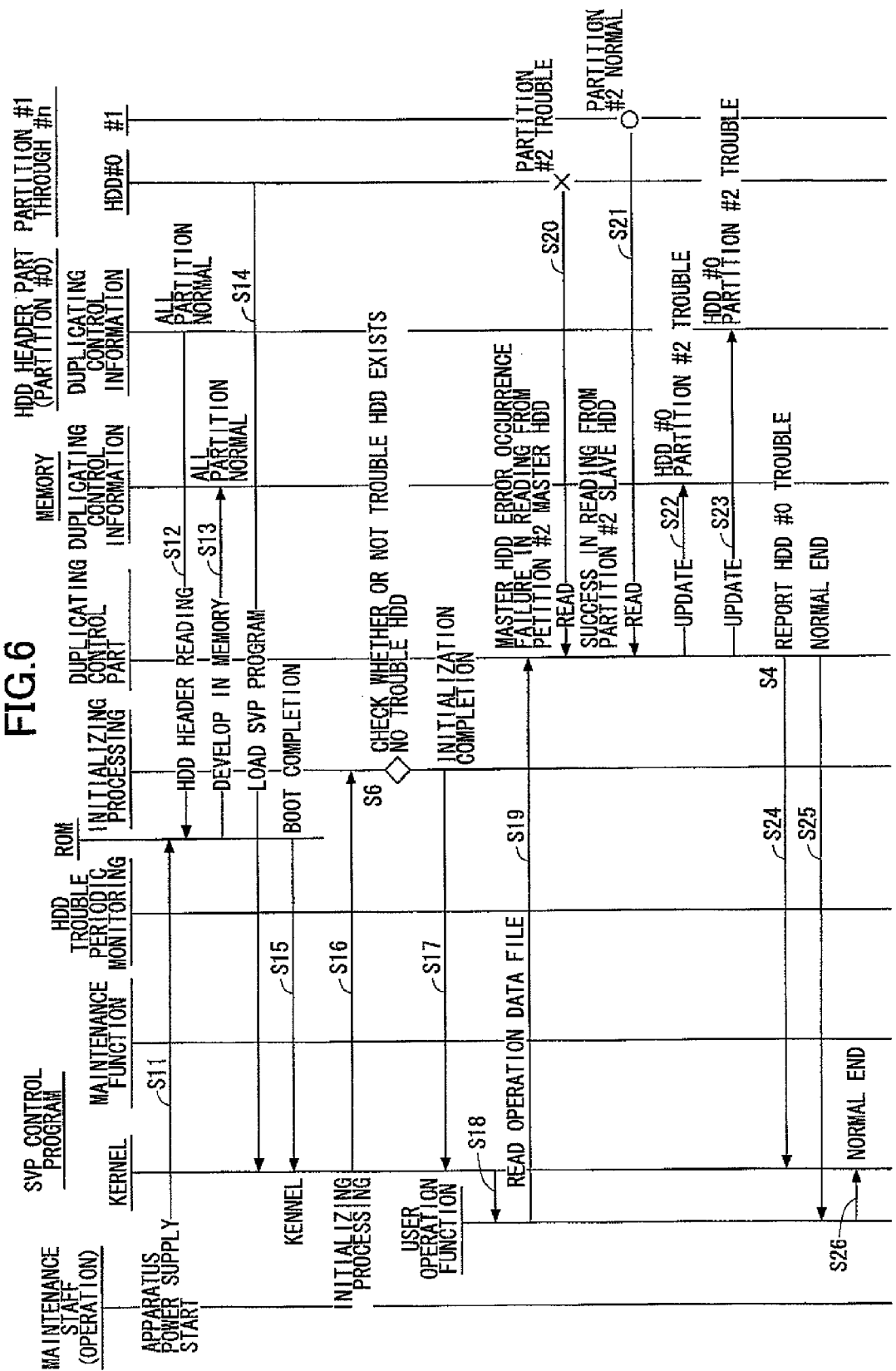
FIGS. 6-9 show a flow chart illustrating a flow of operation of the control method for the information storage apparatus in the embodiment of the present invention.
Figure 7:
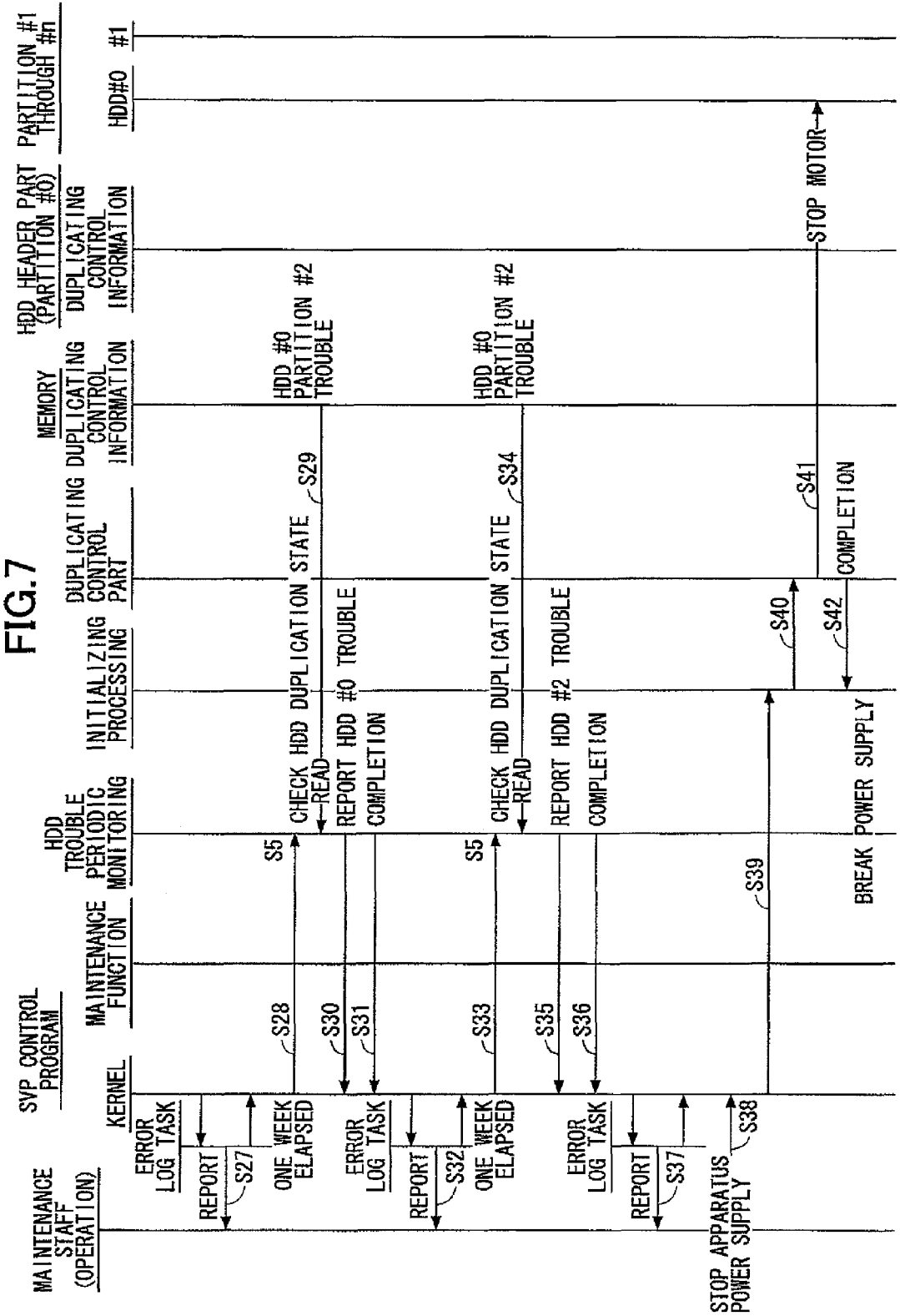

FIGS. 6-7 shows a flow in which the trouble occurs in the hard disk drives 151, 152, after that, the trouble is left unsolved for two weeks, and then, power supply to the computer system is interrupted.

Figure 8:
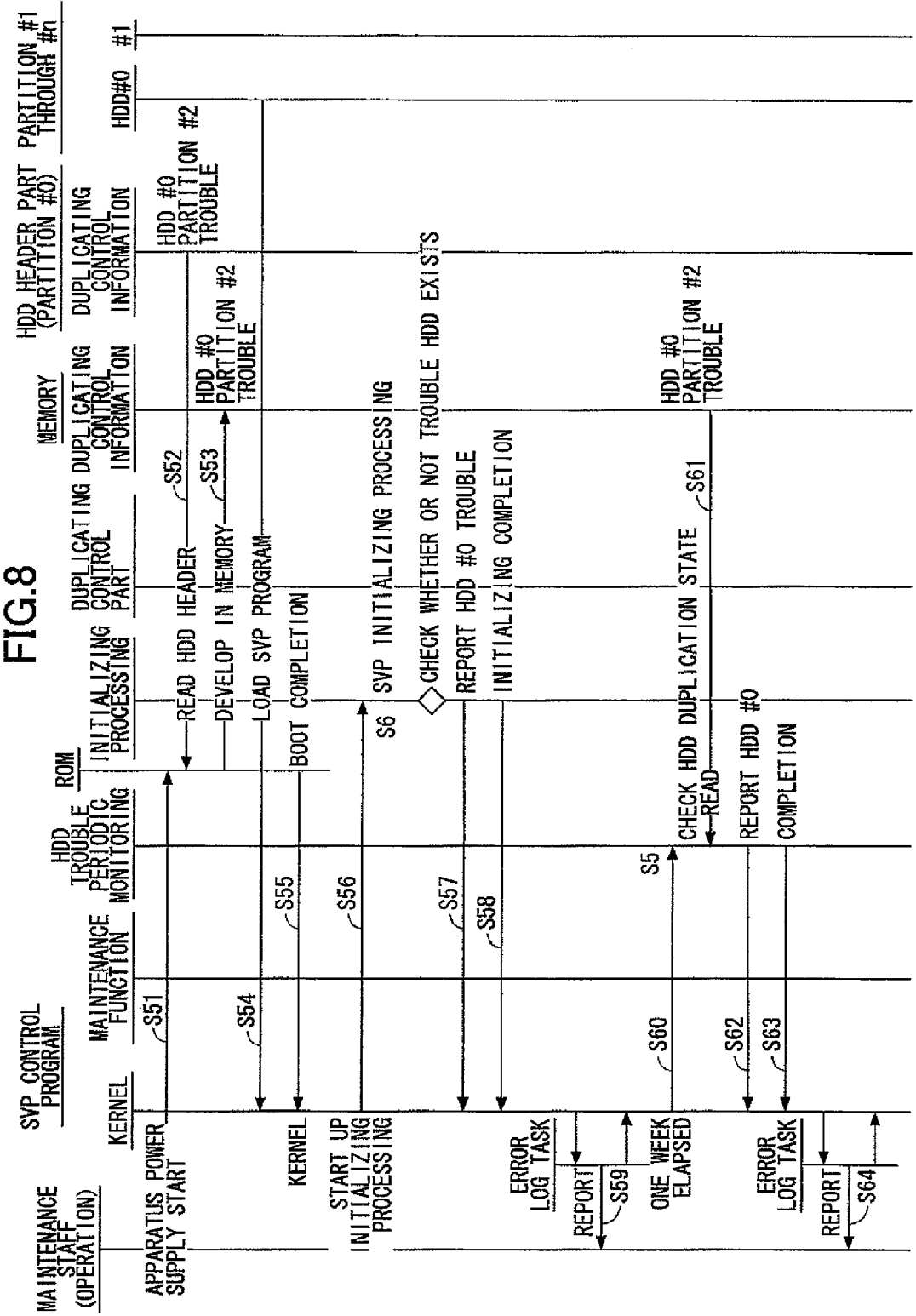

FIG. 7-8 shows a flow in which after the above-mentioned interruption of power supply to the computer system, power supply is again started, and the hard disk drive having the trouble is exchanged in an active exchange manner, after one week.

In this case, it is assumed that, in the duplicated state of the hard disk drives 151, 152, the hard disk drive HDD#0 acts as a master.

It is noted that HDD duplicating control of the hard disk drives 151, 152 includes handling of the duplicating control information stored in the partition #0, the same as that on the other partitions. However, for the sake of convenience of explanation, the duplicating control information in the partition #0 is treated as simple information and logical description is omitted therefor.

In FIG. 6, when a maintenance staff makes operation to start power supply to the computer system (Step S11), header parts of the hard disk drives 151, 152 are read by means of the above-mentioned SVP internal diagnosis function of the program provided in the ROM 121 (Step S12), and the thus-read HDD duplicating control information 31a is developed in the memory 122 (Step S13). This processing will be described later with reference to FIGS. 10-13.

Next, in the same manner, by means of the SVP internal diagnosis function, the SVP control program 20 is read from a header part of the master hard disk drive HDD#0 of the hard disk drives 151, 152, and, is developed in the memory 122 (Step S14). Thus, boot of the kernel 10 is completed (Step S15).

Next, the kernel 10 starts up the initializing task 23 of the SVP control program 20 (Step S16). The initializing task 23 carries out detection of a trouble, if any, of the hard disk drives

151, 152. This processing, i.e., the above-mentioned processing of Step S6, will be described later with reference to FIGS. 14 and 16.

After the initializing processing of the initializing task 23 is properly completed (Step S17), the predetermined user operation function 21a is executed (Step S18), and thus, a predetermined operation data file is read from the master hard disk drive HDD#0 (Step S19).

A case is assumed that a trouble has occurred during the processing of reading the predetermined operation data file from the hard disk drives 151, 152 for the purpose of carrying out the user operation function 21a. That is, it is assumed that a trouble has occurred in the master hard disk drive HDD#0, and then, a trouble is detected upon reading from the partition #2 thereof (Step S20).

In this case, it is assumed that, the HDD duplicating control part 31 tries reading from the partition #2 of the salve hard disk drive HDD#1, and this reading is completed successfully (Step S21).

The HDD duplicating control part 31 responds thereto, and updates the HDD duplicating control information 31a developed in the memory 122 with the contents that the hard disk drive HDD#0 thus has the trouble in its partition #2 (Step S22). Further, the duplicating control part 31 updates, with the same contents, the contents of the header part (partitions #0) of the hard disk drive on the normal side (Step S23).

Next, the HDD duplicating control part 31 reports, to the kernel 10, the trouble of the hard disk drive HDD#0, as a light trouble (Step S24).

Then, it is assumed that, except the above-mentioned 'reading failure' in Step S20, reading of the above-mentioned operation data file has been properly completed (Step S25).

Then, it is assumed that execution of the above-mentioned user operation function 21a has been properly completed (Step S26).

Next, in FIG. 7, the kernel 10 starts up the error log task 24, which then reports, to a maintenance staff, the above-mentioned occurrence of the 'light trouble', by means of the monitoring apparatus 300 or the SVP consol 101 (Step S27).

Then, after an elapse of one week, the kernel 10 starts up the patrol task 25, which then carries out check of the duplicated state of the hard disk drives 151, 152 (Step S5). This processing will be described later with reference to FIGS. 15-16.

As a result, it is detected that the trouble of the hard disk drive HDD#0 for the partition #2 exists (Step S30).

Then, the patrol task 25 reports, to the kernel 10, the trouble of the hard disk drive HDD#0 (Step S31).

After the completion thereof (Step S31), the kernel 10 starts up the error log task 24, which then reports, to a maintenance staff, the 'light trouble', again, by means of the monitoring apparatus 300 or the SVP consol 101 (Step S32).

Further, after another elapse of one week, the kernel 10 again starts up the patrol task 25 (Step S33). After that, the processing of Steps S34 through S37, the same as the above-mentioned processing of Steps S29 through S32, is carried out.

Then, it is assumed that a maintenance staff makes operation to stop power supply to the computer system (Step S38).

As a result, under the control of the kernel 10, by means of the initializing task 23, the hard disk drives 151, 152 are stopped by the HDD duplicating control part 31 (Steps S39 through S41). In response thereto, the initializing task 23 breaks power supply to the computer system (Step S42).

Next, in FIG. 8, when a maintenance staff then makes operation to starts power supply to the computer system, the same as the operation starting from Step S11 mentioned above, the SVP internal diagnosis function by the program in the ROM 121 reads the header parts of the hard disk drives 151, 152 (Step S52). It is noted that, as mentioned above, in the header parts, the trouble of the partition #2 of the hard disk drive HDD#0 is recorded in Step S23.

Further, the SVP internal diagnosis function develops the HDD duplicating control information thus read, in the memory 122 (Step S53). Then, the SVP control program is loaded in the memory 122 (Step S54), and thus, boot of the kernel 10 is completed (Step S55).

Next, the kernel 10 starts up the initializing task 23 of the SVP control pogrom 20 (Step S56), and the initializing task 23 carries out processing of detecting a trouble, if any, of the hard disk drives 151, 152. As mentioned above, this processing, i.e., the above-mentioned processing of Step S6, will be described later with reference to FIGS. 14 and 16.

In this processing, the initializing task 23 recognizes the trouble of the partition #2 of the hard disk drive HDD#0, reports the 'light trouble' to a maintenance staff by means of the error log task 24, and also by means of the monitoring apparatus 300 or the SVP consol 101 (Steps S57, S59) and thus, finishes this initializing processing (Step S58).

After further another elapse of one week, the kernel 10 again starts up the patrol task 25 (Step S60). After that, the processing of Steps S61 through S64, the same as the above-mentioned processing of the Steps S29 through S32, is carried out.

Figure 9:
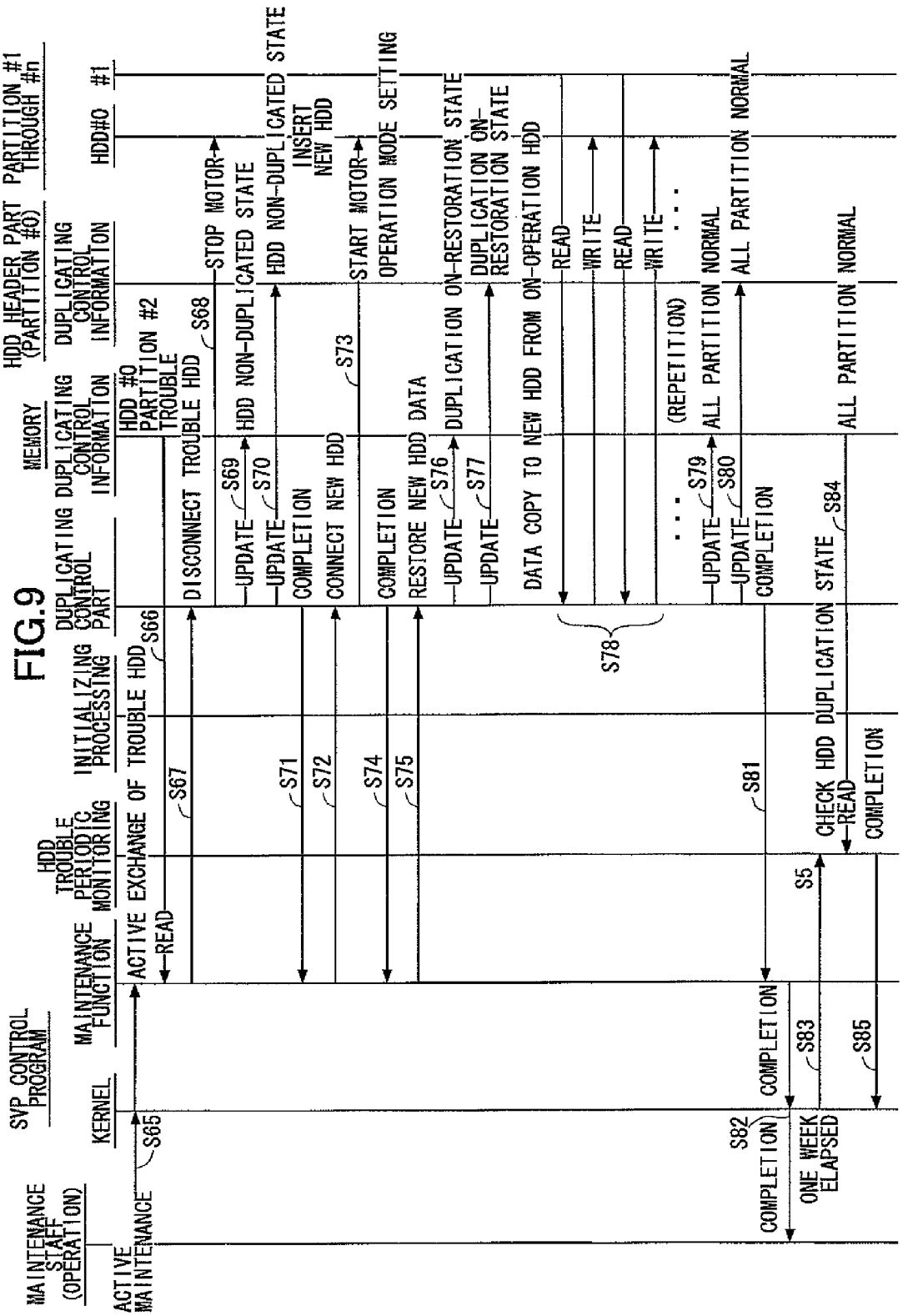

Then, in FIG. 9, it is assumed that a maintenance staff carries out in Step S65 active exchange of the hard disk drive HDD#0 having the trouble as mentioned above.

In this case, by means of the maintenance function 21b of the frame task 21 of the SVP control program 20, the HDD duplicating control information 31a developed in the memory 122 in Step S53 is read (Step S66), and as a result, it is recognized that the hard disk drive, having the trouble and thus, to be exchanged in an active state (i.e., active exchange), corresponds to the hard disk drive HDD#0.

As a result, the above-mentioned maintenance function 21b provides such instructions to disconnect the hard disk drive HDD#0 from the SVP 100 (Step S67), in response thereto the duplicating control part 31 stops a motor of the hard disk drive (Step S68), and thus, an 'HDD non-duplicated operation' state only with the hard disk drive HDD#1 on the normal side is entered. Then, with the contents that the HDD non-duplicated operation state is thus entered, the HDD duplicating control information 31a developed in the memory 122 and the HDD duplicating control information in the header parts of the hard disk drive on the normal side are updated (Steps S69 and S70). Then, the matter that the processing of entering the HDD non-duplicated operation state is completed is reported to the above-mentioned maintenance function 21b (Step S71).

After that, the maintenance staff actually exchanges the trouble hard disk drive HDD#0 for a new one, in an active state, and as a result, the maintenance function 21b provides such instructions to the HDD duplicating control part 31 as to restore the original duplicated state with the use of the new hard disk drive HDD#0 which is thus exchanged for by the maintenance staff (Step S75).

In response thereto, the HDD duplicating control part 31 updates the HDD duplicating control information 31a developed in the memory 122 and the header part of the hard disk drive on the normal side, respectively, with the contents that HDD duplication on-restoration state is entered (Steps S76, S77).

Then, in Step S78, the HDD duplicating control part 31 restores the original HDD duplicated state as a result of the information stored in the hard disk drive HDD#1 currently on operation being copied to the new hard disk drive HDD#0 which is thus exchanged for.

When the copying processing is completed on all the partitions properly, the HDD duplicating control information 31a developed in the memory 122 and the HDD duplicating control information in the header parts of both hard disk drives are updated by the contents of 'normal state' (Steps S79, S80).

Then, the HDD duplicating control part 31 reports, to the maintenance function 21b, that the HDD duplicated state restoration is thus completed (Step S81).

Then, the kernel 10 again starts up the patrol task 25 after further another elapse of one week (Step S83).

In this case, since the 'normal state' is recorded in the HDD duplicating control information 31a developed in the memory 122 in Step S79, this is read, and as a result, the patrol task 25 returns, to the kernel 10, that the processing of checking the HDD duplicated state is normally completed (Step S85).

Thus, according to the embodiment 1 of the present invention, by means of the functions of the initializing task 3 and the function of the patrol task 25, if a state in which a duplicated state of the hard disk drives 151, 152 breaks is overlooked, this state is reported to a maintenance staff, when the SVP 100 is started again, and also, periodically during operation of the computer system.

Accordingly, even if the maintenance staff cannot solve the problem of breakage of the duplicated state, in response to the first report, after that the maintenance staff's attention can be called again, when the computer system is started up again, and also, periodically during operation of the computer system.

Therefore, it is possible to effectively avoid a problematic situation that a loss of a duplicated state of the hard disk drives 151, 152 is left unsolved for a long period.

Next, with reference to FIGS. 10-13, details of the above-mentioned processing of reading the HDD duplicating control information from the header parts of the hard disk drives 151, 152, and developing the same in the memory 122, by the SVP internal diagnosis function of the program stored in the ROM 121, will be described.

Figure 10:
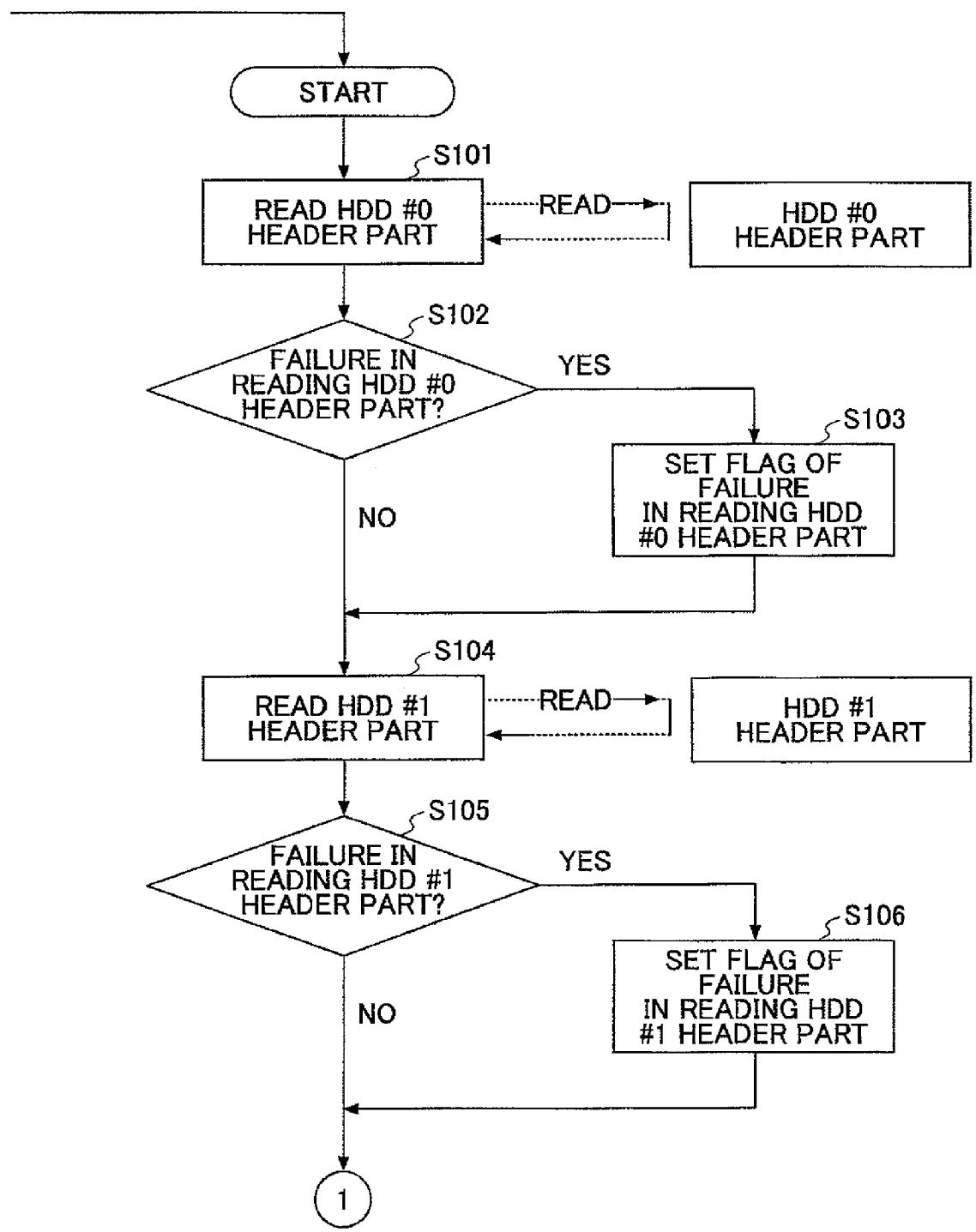
FIGS. 10-13 show a flow chart illustrating a flow of operation of processing of developing of the HDD duplicating control information according to the control method for the information storage apparatus in the embodiment of the present invention.

In FIG. 10, by the above-mentioned SVP internal diagnosis function, the header part of the hard disk drive HDD#0 is read (Step S101), and, when the reading from the header part results in failure, a flag indicating it is set (Yes in Step S102 and Step S103).

Similarly, the header part of the hard disk drive HDD#1 is read (Step S104), and, when the reading from the header part results in failure, a flag indicating it is set (Yes in Step S105 and Step S106).

Figure 11:
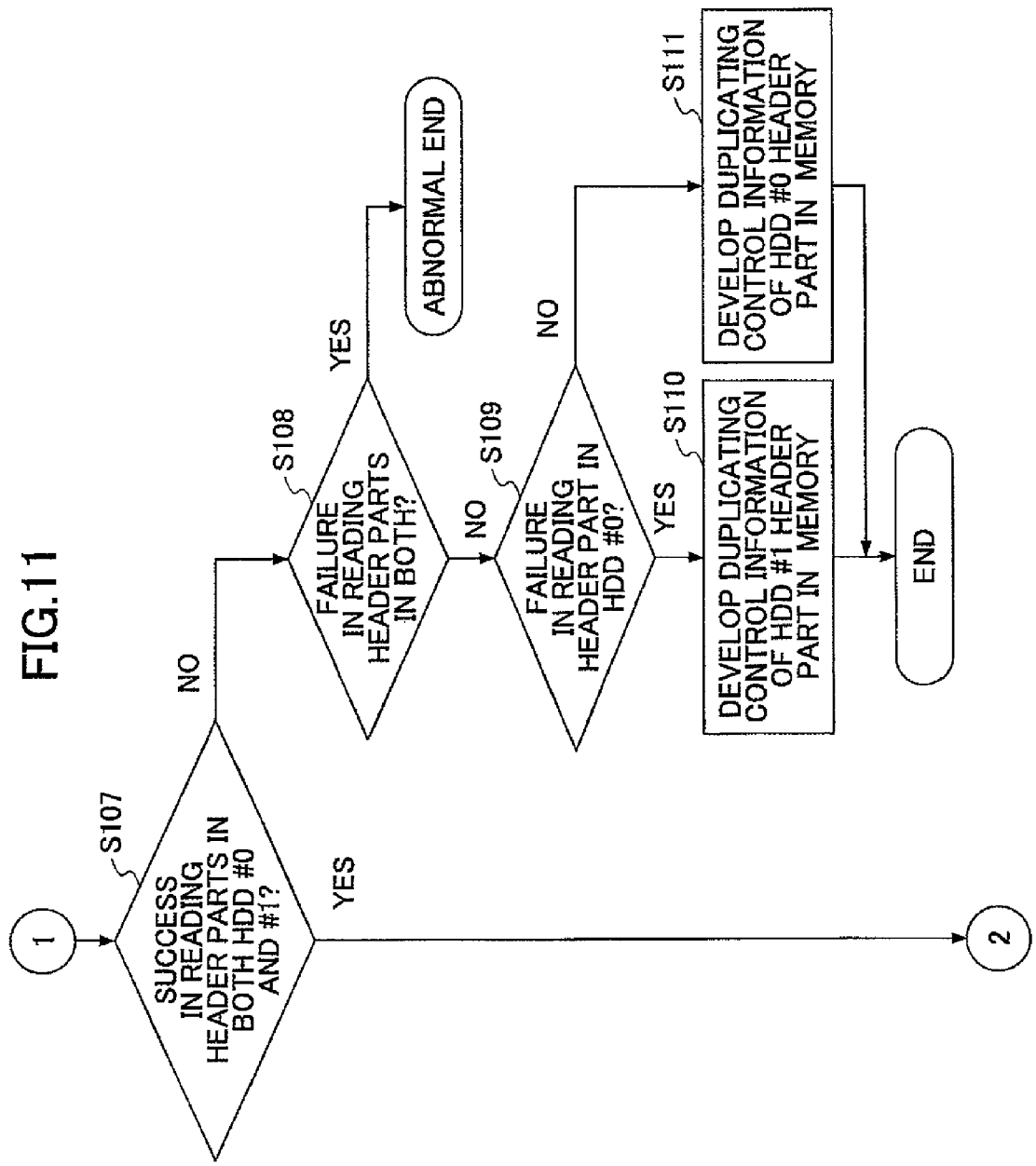
Figure 12:
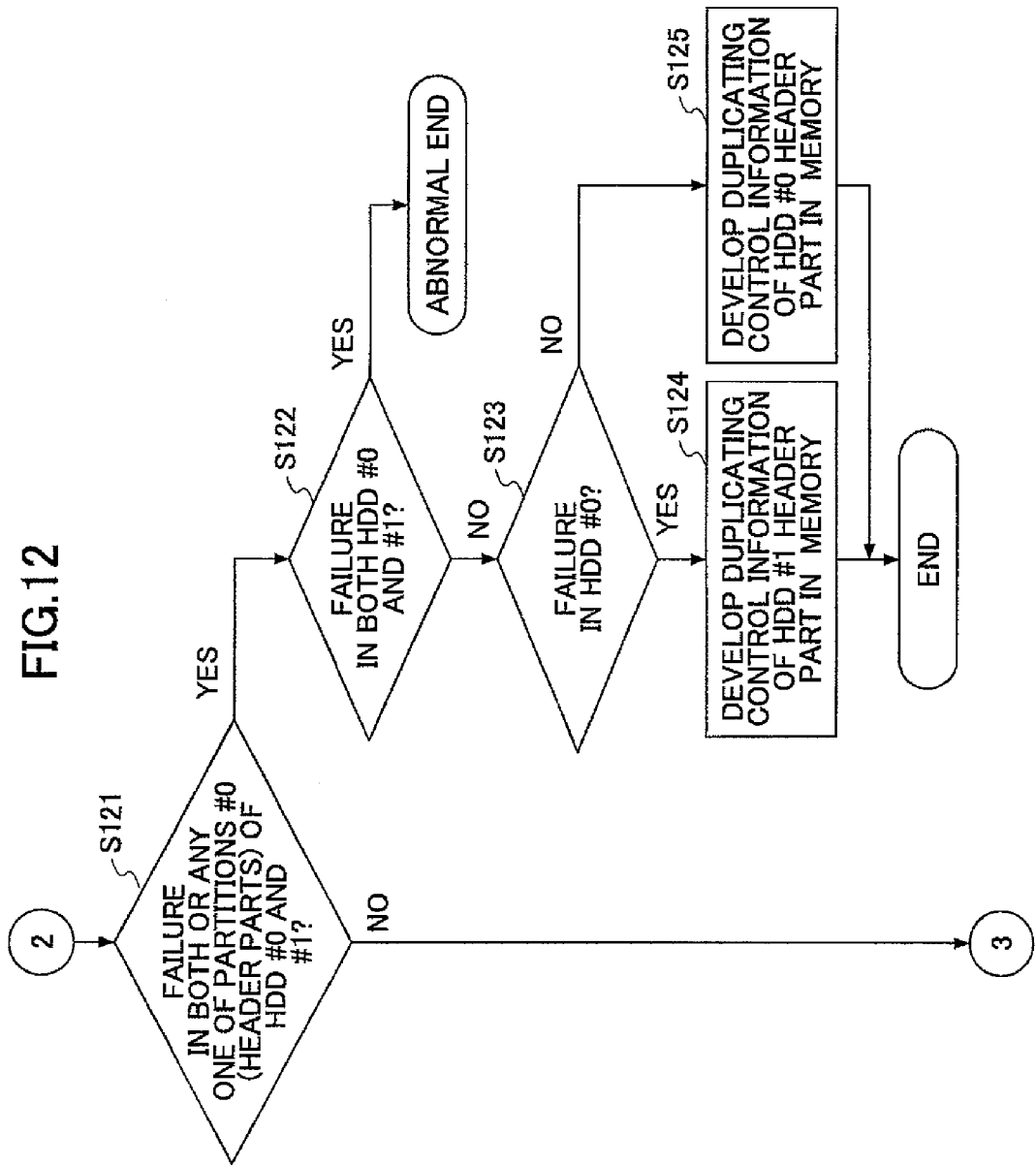

Next, in FIG. 11, in Step S107, by reading the above-mentioned flag, it is determined whether or not reading from the header parts of both hard disk drives HDD#0, HDD#1 has succeeded.

When reading from the header parts results in failure for both hard disk drives HDD#0, HDD#1 (Yes in Step S108), the operation of the SVP internal diagnosis function of the program of the ROM 121 ends abnormally. In this case, the processing is finished without the SVP control program being loaded. (The SPC 102 displays an error code indicating a failure of starting up of the SVP on a panel when detecting stoppage of the SVP, by a life check function for the SVP. The SPC 102 stops the processing when it is not possible to start up the program of the ROM 121 even after trying starting up three times.)

On the other hand, when reading from the header part results in failure only for the hard disk drive #0 (Yes in Step S109), the HDD duplicating control information properly read from the header part of the hard disk drive HDD#1 is developed in the memory 122 (Step S110).

Similarly, when reading from the header part results in failure only for the hard disk drive #1 (No in Step S109), the HDD duplicating control information properly read from the header part of the hard disk drive HDD#0 is developed in the memory 122 (Step S111).

Further, reading from the harder parts has succeeded for both hard disk drives HDD#0, HDD#1 (Yes in Step S107), the following processing is carried out. That is, when troubles, if any, of the partitions #0 (corresponding to the header parts) of both hard disk drives HDD#0, HDD#1 are recorded in the information thus read from the header parts (Yes in Step S121, Yes in Step S122 of FIG. 12), the operation of the SVP internal diagnosis function of the program of the ROM 121 ends abnormally. In this case, the processing is finished without the SVP control program being loaded. (The SPC 102 displays an error code indicating a failure of starting up of the SVP on the panel when detecting stoppage of the SVP, by a life check function for the SVP. The SPC 102 stops the processing when it is not possible to start up the program of the ROM 121 even after trying starting up three times.)

On the other hand, when a trouble, if any, of the partition #0 is recorded only for the hard disk drive HDD#0 (Yes in Step S123), the HDD duplicating control information properly read from the hard disk drive HDD#1 is developed in the memory 122 (Step S124).

When a trouble, if any, of the partition #0 is recorded only for the hard disk drive HDD#1 (No in Step S123), the HDD duplicating control information properly read from the hard disk drive HDD#0 is developed in the memory 122 (Step S125).

Figure 13:
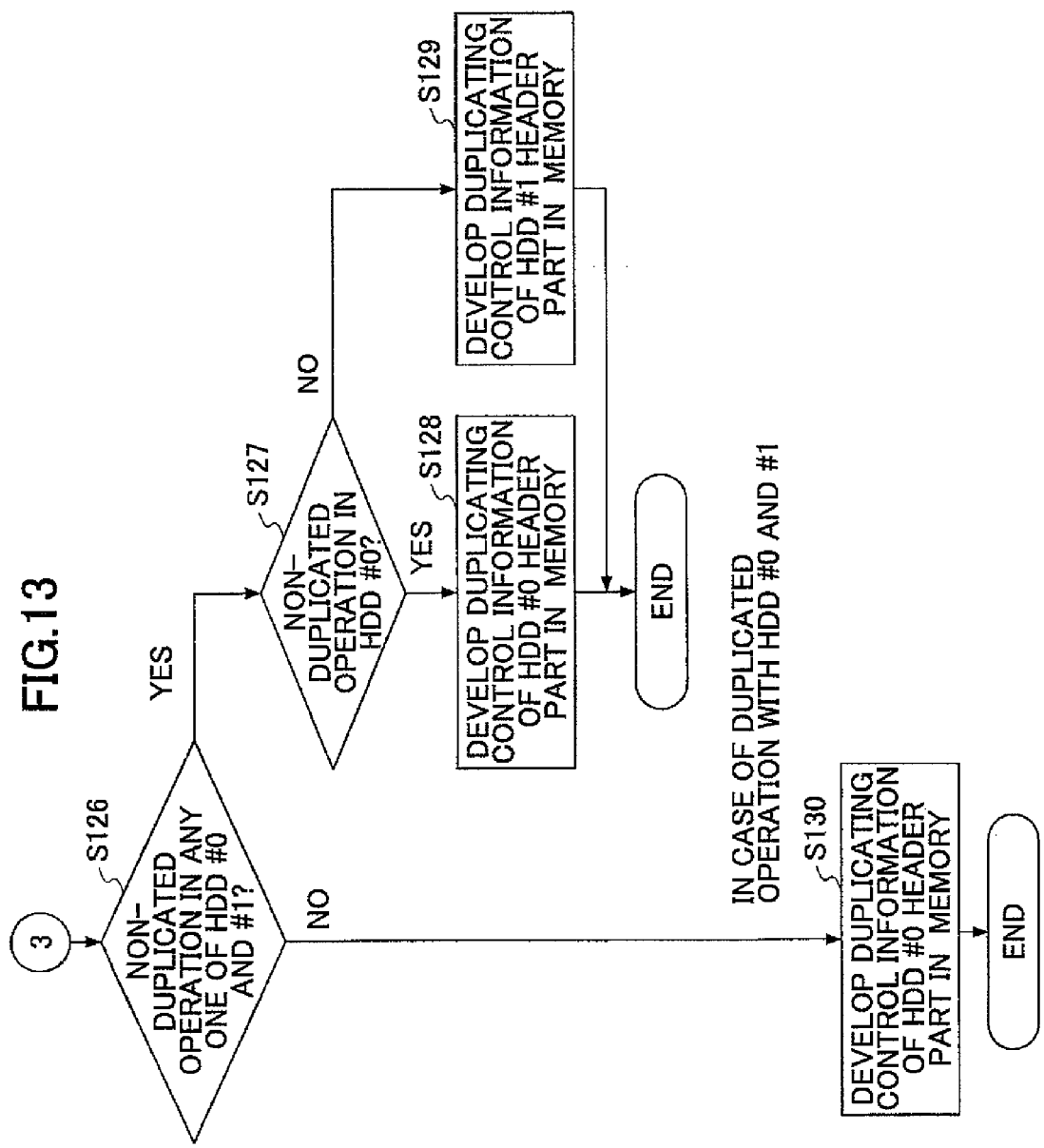

When no trouble of the partitions #0 is recorded for both hard disk drives HDD#0, HDD#1, Step S126 in FIG. 13 is proceeded to.

Then, when the current state is a HDD non-duplicated operation state with the hard disk HDD#0 (Yes in Step S126, Yes in Step S127), the HDD duplicating control information read from the header part of the hard disk drive HDD#0 is developed in the memory 122 (Step S128).

When the current state is a HDD non-duplicated operation state with the hard disk HDD#1 (Yes in Step S126, No in Step S127), the HDD duplicating control information read from the header part of the hard disk drive HDD#1 is developed in the memory 122 (Step S129).

When the current state is not a HDD non-duplicated operation state, i.e., the current state is a HDD duplicated operation state (No in Step S126), the HDD duplicating control information read from the header part of the hard disk drive HDD#0 is developed in the memory 122 (Step S130).

Thus, in the embodiment 1 of the present invention, when the HDD duplicating control information is to be read from the header parts of the hard disk drives HDD#0, HDD#1 in Step S13 of FIG. 6 or Step S53 of FIG. 8, the HDD duplicating control information read from the header part of the hard disk drive on the side on which reading has succeeded is developed in the memory 122 (Steps S108 through S111), the HDD duplicating control information read from the header part of the hard disk drive on the side on which the partition #0 has no trouble is devolved in the memory 122 (Steps S122 through S125), or the HDD duplicating control information read from the header part of the hard disk drive on the side on operation is devolved in the memory 122 (Steps S127 through S129), when reading from the header part of one hard disk drive results in failure, when a trouble of the partition #0 in which the header part is stored is recognized from the contents of the header part thus read, or when the current state is an HDD non-duplicated operation state.

As a result, it is possible to develop the HDD duplicating control information which is more reliable one, in the memory 122.

Figure 14:
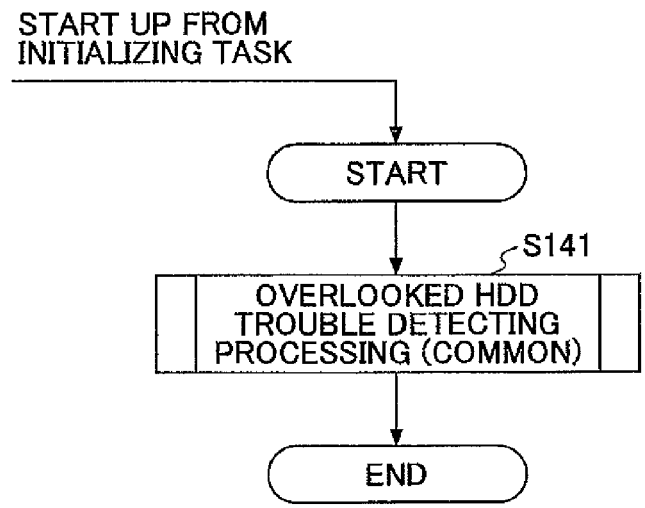
FIG. 14 is a flow chart illustrating a flow of operation of hard disk trouble detecting processing upon initialization in the control method for the information storage apparatus in the embodiment of the present invention.
Figure 15:
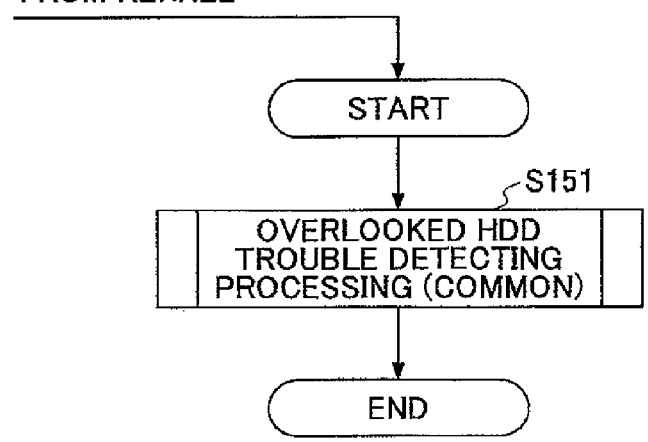
FIG. 15 is a flow chart illustrating a flow of operation of periodic monitoring processing for a hard disk drive trouble in the control method for the information storage apparatus in the embodiment of the present invention.
Figure 16:
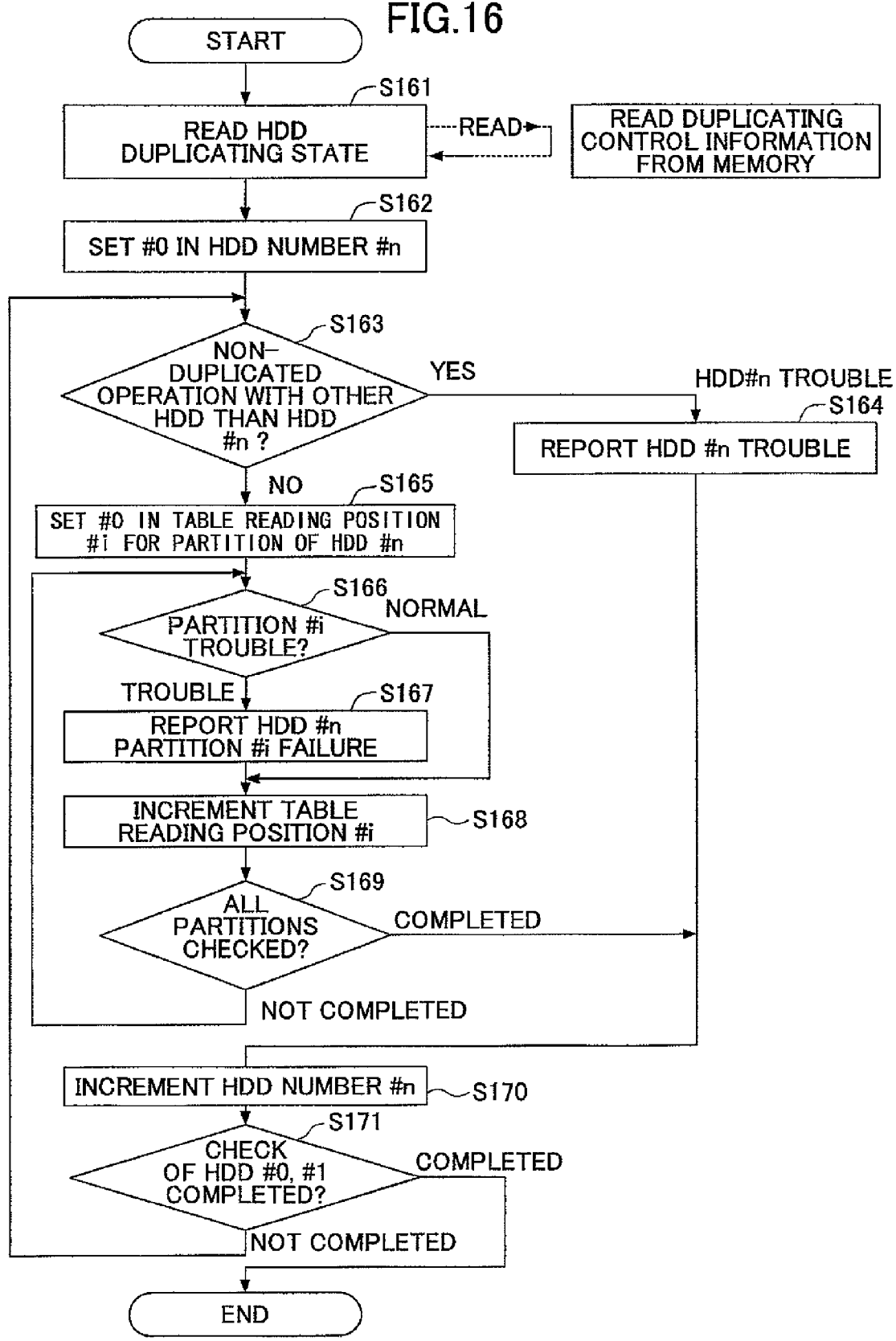
FIG. 16 is a flow chart illustrating a flow of operation of overlooked hard disk drive detecting processing for a hard disk drive trouble, in the control method for the information storage apparatus in the embodiment of the present invention.

Next, with reference to FIGS. 14, 15 and 16, details of the processing of checking a HDD duplicated state (Steps S28, S5; S33, S5 of FIG. 7, Steps S60, S5 of FIG. 8, or Steps S83, S5 of FIG. 9), which is carried out upon initializing processing (Steps S16, S6 of FIG. 6, or Steps S56, S6 of FIG. 8), or periodically every week.

First, the kernel 10 starts up the initializing task 23 upon initializing processing, and the processing of checking the HDD duplicated state is carried out (Step S141 of FIG. 14).

Similarly, in the processing of checking the HDD duplicated state, carried out periodically every week, the kernel 10 starts up the initializing task 23 upon initializing processing, and the processing of checking the HDD duplicated state is carried out (Step S151 of FIG. 15).

FIG. 16 shows a flow of the processing of checking the HDD duplicated state carried out in each of Steps S141 and S151.

In FIG. 16, when the HDD duplicating control information 31a thus developed in the memory 122 is read (Step S161), as a number of the hard disk drive to be read at this time, #0 (i.e., HDD#0) is set (Step S162).

Then, when the current state is a HDD non-duplicated operation state with the hard disk drive other than the thus set hard disk drive HDD#0, i.e., the current state is a HDD non-duplicated operation state with the hard disk drive HDD#1 (Yes in Step S163), it is reported to the kernel 10 that the hard disk drive HDD#0 has a trouble (Step S164).

On the other hand, when the current state is other than an HDD non-duplicated operation state, i.e., the current state is a HDD duplicated operation state (No in Step S163), the number of a partition to be read is set as #0 (Step S165). Then, when a trouble is recorded for the partition in the above-mentioned HDD duplicating control information 31a ('TROUBLE' in Step S166), this matter is reported to the kernel 10 (Step S167).

Then, the number of a partition to be read is incremented by one (Step S168), and, then, it is determined whether or not all the partitions have been checked (Step S169). Then, until all the partitions are checked ('COMPLETED' in Step S169), the number of a partition to be read is incremented in sequence (Step S168), and thus, the respective partitions are checked as to whether or not it has a trouble (Step S166). When a partition has a trouble, this matter is reported to the kernel 10 in each case (Step S167).

When all the partitions are thus checked ('COMPLETED' in Step S169), the number of a hard disk to be checked is incremented by one (Step S170), and thus, the other hard disk drive, that is, HDD#1, is checked, and, a trouble thereof, if any, is reported to the kernel 10 in the same manner (Steps S163 through S169).

Next, with reference to FIGS. 17-18, details of a flow of the processing of active exchange of the trouble hard disk drive starting from Step S66 of FIG. 9, will be described.

In FIG. 17, in Step S181, the above-mentioned maintenance function 21b reads the HDD duplicating control information 31a developed in the memory 122, and displays the contents thereof to a display device provided on the maintenance terminal 202, to a maintenance staff (Step S182).

When, in response thereto, the maintenance staff makes operation on the maintenance terminal 202 to disconnect the trouble hard disk drive (Step S183), the function of the HDD duplicating control part 31 disconnects the trouble hard disk drive from the SVP 100, and a completion of this operation is reported to the maintenance function 21b via the HDD duplicating control part 31.

The maintenance function 21b responds thereto, and updates the HDD duplicating control information of the head part of the on-operation hard disk drive and the memory, by the matter that, from the above-mentioned operation, a non-duplicated operation state is entered (Step S184).

Further, the maintenance function 21b urges the maintenance staff, from the display device of the maintenance terminal 202, to actually exchange the trouble hard disk drive (Step S185).

Next, in FIG. 18, when the maintenance staff actually carries out exchanging of the trouble hard disk drive for a new one, and provides instructions to connect the new hard disk drive, the maintenance function 21b carries out operation to connect the new hard disk drive to the SVP 100 (Step S186), and updates the HDD duplicating control information of the on-operation hard disk drive and the memory, by the matter that an HDD duplication on-restoration state is entered (Step S187).

Then, by means of the HDD duplicating control part 31, such a display is made from the display device of the maintenance terminal 202 to the maintenance staff that, such operation is started that information stored in the on-operation hard disk drive is copied to the new hard disk drive, and thus, the original duplicated state is to be restored (Step S188).

After that, the operation for restoring the original HDD duplicated state by copying the information stored in the on-operation hard disk drive to the new hard disk drive is carried out in sequence (Step S189). At this time, on the display device of the maintenance terminal 202, the progress of the operation of copying the stored information is displayed (Step S190).

When the operation of copying the information for restoring the HDD duplicated state has been completed for all the partitions, the maintenance function 21b updates the HDD duplicating control information of the hard disk drives and the memory by the matter that the HDD duplicated state is entered, by means of the HDD duplicating control part 31 (Step S191).

Then, on the display device of the maintenance terminal 202, such a display is made that the active exchange of the trouble hard disk drive has been completed (Step S192).

When maintenance is made during the user operation being under suspension, the SVP consol 101 is operated by a maintenance staff so that a maintenance mode is entered, and after that the trouble part can be exchanged in the same manner.

Next, an embodiment 2 of the present invention will be described.

The embodiment 2 of the present invention has a configuration the same as that of the embodiment 1 described above, and what is different from the embodiment 1 is that the number of hard disk drives for providing redundancy is three or more, while the number of hard disk drives for providing redundancy is two in the embodiment 1.

The contents concerning this difference will now be described, and thus, duplicate description is omitted appropriately.

In this case, (1) as a configuration of hard disk drives for providing redundancy, the same as that of the embodiment 1 described above, all the hard disk drives are partitioned in the same configuration, and the same data is stored in the corresponding positions of the respective hard disk drives.

Further, the same as the above-mentioned embodiment 1, areas allocated to the corresponding positions in all the hard disk drives are called partitions, which are regarded as units for the redundancy control.

Each partition is duplicately possessed by one master hard disk drive and one or more slave hard disk drives.

(2) As HDD redundancy control information corresponding to the above-mentioned HDD duplicating control information 31a, identification numbers corresponding to mounting positions are given in order from #0, to the plurality of hard disk drives.

Further, to the plurality partitions, identification numbers are given from #0 in an order of addresses in the hard disk drives.

The HDD redundancy control information is configured by data tables corresponding to these partition numbers.

In each table, the number of the master hard disk drive which possesses the partition, and the number of a trouble hard disk drive, if any, which also possesses the partition, may be written. The redundancy control information is stored in the partition #0.

The HDD redundancy control information is developed in a memory of an SVP from the hard disk drive when power supply to a computer system is started, and the HDD redundant state in the previous operation is thus kept.

When the state of the hard disk drives providing the redundancy changes during operation, the HDD redundancy control information in the memory is updated accordingly, and simultaneously, the HDD redundancy control information in the partitions #0 of the hard disk drives are updated.

(3) In processing of writing into the hard disk drives by means of an HDD redundancy control part corresponding to the HDD duplicating control part 31 in the embodiment 1, the identical data is written in all the areas of the hard disk drives having each partition.

In processing of reading from the hard disk drives, data is read from the area of the master hard disk drive having each partition.

When an error occurs in the above-mentioned writing processing, the master hard disk or the slave hard disk having the partition is recognized as having a trouble.

When an error occurs in the above-mentioned reading processing, the master hard disk having the partition is recognized as having a trouble.

When the master hard disk drive having the partition has a trouble during reading processing or writing processing, any hard disk drive having the corresponding partition duplicately having no trouble is allocated as a new master hard disk drive for the partition.

(4) In processing of reporting a trouble of a hard disk drive by means of the HDD redundant control part, when a predetermined number of hard disk drives among the master and slave hard disk drives which duplicately or redundantly possess corresponding ones of each partition have troubles, it is determined that the hard disk drives providing redundancy have a light trouble (i.e., a redundancy failure in the partition).

Then, when the light trouble (redundancy failure in the partition) is detected, the light trouble is reported to a maintenance staff.

(5) A patrol task (corresponding to the patrol task 25 in the embodiment 1) having a function of periodically monitoring a trouble of the hard disk drives is periodically started up, and therewith, it is monitored as to whether or not a light trouble (redundancy failure in a partition) exists in the hard disk drives.

When a light trouble is detected in this processing, the light trouble is reported to a maintenance staff. Then, further, every elapse of a predetermined period, it is checked as to whether or not a light trouble exists in the hard disk drives. Thus, until the original redundant state of the hard disk drives is restored as a result of the light trouble being solved, reporting of the light trouble to a maintenance staff is repeated.

(6) In processing of detecting a trouble, if any, of the hard disk drives in initializing processing, detecting a light trouble (redundancy failure in a partition) of the hard disk drives, if any, is carried out when operation of the SVP is started by a maintenance staff after the operation is stopped.

When a light trouble is detected in this processing, the light trouble is reported to a maintenance staff.

Thus, in the embodiment 2 of the present invention, in a condition where redundancy of information is provided by a plurality of hard disk drives, that is, in a condition where the plurality of hard disk drives duplicately or redundantly store the identical information and thus security of the information thus stored is improved since even if the stored information is lost in one or some hard disk drives (the number of which is smaller than the number of all the hard disk drives originally providing the redundancy) among the plurality of hard disk drives the identical information is still stored in the remaining hard disk drives, a matter that information stored in one or a predetermined number of hard disk drives is lost, if any, which number is smaller than the number of all the hard disk drives which originally provides the redundancy, is automatically reported to a maintenance staff, and also, the reporting is carried out every time when the SVP is started up, and also, every predetermined intervals during operation.

As a result, even if a maintenance staff misses carrying out appropriate processing, i.e., exchanging the trouble hard disk or such immediately after receiving an initial report, the same report is given each time when the SVP is started up, and also, every predetermined intervals during operation, automatically. Thus, it is possible to effectively avoid such a problematic situation that a state in which the redundant state is lost, i.e., a redundancy failure, is left unsolved for a long period.

While the invention herein disclosed has been described by means of specific embodiments and applications thereof, numerous modifications and variations could be made thereto by those skilled in the art without departing from the scope of the invention set forth in the claims.

The present application is based on Japanese Laid-Open Patent Application No. 2006-346213, filed on Dec. 22, 2006, the entire contents of which are hereby incorporated herein by reference.

What is claimed is:

1. A control method for an information storage apparatus which redundantly stores information, the control method comprising:

recording, by a redundancy failure recording part, a record indicating a redundancy failure in a state recording part that stores a record indicating a redundancy state, when the redundancy failure has occurred;

monitoring, by a redundancy monitoring part, the record stored in the state recording part; and reporting, by a reporting part, the redundancy failure when the record of the redundancy failure is read from the state recording part by the redundancy monitoring part, the reading of the record of the redundancy failure by the redundancy monitoring part being constantly performed at intervals thereby to constantly report the redundancy failure until the redundancy failure is no longer in existence.

2. The control method for the information storage apparatus as claimed in claim 1, wherein:

the redundancy failure has occurred when a storage device for writing thereto a copy of the information for the purpose of redundantly storing the information is not available due to a trouble in the storage device.

3. The control method as claimed in claim 1, wherein:

the monitoring of the record stored in the state recording part is carried out when the information storage apparatus is started up.

4. The control method as claimed in claim 1, wherein redundancy control information is stored in a header part of the information storage apparatus which redundantly stores information, the redundancy control information being used to provide redundancy for the information storage apparatus.

5. An information storage apparatus which redundantly stores information, comprising:

a state recording part configured to store a record indicating a redundant state;

a redundancy failure recording part configured to record a record indicating a redundancy failure in the state recording part, when the redundancy failure has occurred;

a redundancy monitoring part configured to monitor the record in the state recording part; and a reporting part configured to report the redundancy failure when the record of the redundancy failure is read from the state recording part by the redundancy monitoring part, the reading of the record of the redundancy failure by the redundancy monitoring part being constantly performed at intervals thereby to constantly report the redundancy failure until the redundancy failure is no longer in existence.

6. The information storage apparatus as claimed in claim 5, wherein:

the redundancy failure has occurred when a storage device for writing thereto a copy of information for the purpose of redundantly storing the information is not available due to a trouble in the storage device.

7. The information storage apparatus as claimed in claim 5, wherein:

the redundancy monitoring part monitors the record stored in the state recording part when the information storage apparatus is started up.

8. The information storage apparatus as claimed in claim 5, further comprising a header part configured to store redundancy control information, the redundancy control information being used to provide redundancy for the information storage apparatus.

9. A non-transitory information recording medium storing a program for controlling an information storage apparatus that redundantly stores information, comprising instructions for causing a computer to act as:

state recording means for recording a record indicating a redundancy state;

redundancy failure recording means for recoding a record indicating redundancy failure in the state recording means, when the redundancy failure has occurred;

redundancy monitoring means for monitoring the record stored in the state recording means; and reporting means for reporting the redundancy failure when the record of the redundancy failure is read from the state recording means by the redundancy monitoring means, the reading of the record of the redundancy failure by the redundancy monitoring means being constantly performed at intervals thereby to constantly report the redundancy failure until the redundancy failure is no longer in existence.

10. The non-transitory information recording medium storing therein the program claimed in claim 9, wherein:

the redundancy failure has occurred when a storage device for writing thereto a copy of information for the purpose of redundantly storing information is not available due to a trouble in the storage device.

11. The non-transitory information recording medium storing therein the program claimed in claim 9 wherein:

the redundancy monitoring means monitors the record stored in the state recording means when the information storage apparatus is started up.

12. The information recording medium claimed in claim 9, wherein redundancy control information is stored in a header part of the information storage apparatus which redundantly stores information, the redundancy control information being used to provide redundancy for the information storage apparatus.

* * * * *